(12) United States Patent
Shao et al.

(10) Patent No.: US 8,024,349 B1
(45) Date of Patent: Sep. 20, 2011

(54) STRING-BASED SYSTEMS AND METHODS FOR SEARCHING FOR REAL ESTATE PROPERTIES

(76) Inventors: Henry K. Shao, San Francisco, CA (US); Xiangyang Yao, Cupertino, CA (US)

( * ) Notice: Subject to any disclaimer, the term of this patent is extended or adjusted under 35 U.S.C. 154(b) by 566 days.

(21) Appl. No.: 11/459,928

(22) Filed: Jul. 25, 2006

Related U.S. Application Data

(60) Provisional application No. 60/702,737, filed on Jul. 25, 2005, provisional application No. 60/730,940, filed on Oct. 26, 2005.

(51) Int. Cl.
*G06F 17/30* (2006.01)
*G06F 7/00* (2006.01)

(52) U.S. Cl. ......... 707/769; 707/756; 707/767; 707/946

(58) Field of Classification Search ........................ None
See application file for complete search history.

(56) References Cited

U.S. PATENT DOCUMENTS

| | | | |
|---|---|---|---|
| 5,956,711 A * | 9/1999 | Sullivan et al. ........................ | 1/1 |
| 6,397,212 B1 * | 5/2002 | Biffar ............................ | 707/704 |
| 6,438,539 B1 * | 8/2002 | Korolev et al. .................... | 707/3 |
| 6,604,101 B1 * | 8/2003 | Chan et al. .................... | 707/706 |
| 6,799,174 B2 * | 9/2004 | Chipman et al. ...................... | 1/1 |
| 7,013,478 B1 * | 3/2006 | Hendricks et al. .............. | 725/46 |
| 2002/0095447 A1 * | 7/2002 | Weber et al. ................... | 707/530 |
| 2002/0138479 A1 * | 9/2002 | Bates et al. ........................ | 707/5 |
| 2005/0086158 A1 * | 4/2005 | Clare .............................. | 705/38 |
| 2005/0091037 A1 * | 4/2005 | Haluptzok et al. ................. | 704/9 |
| 2006/0004744 A1 * | 1/2006 | Nevidomski et al. .............. | 707/4 |
| 2006/0074859 A1 * | 4/2006 | Gange et al. ...................... | 707/3 |
| 2006/0190447 A1 * | 8/2006 | Harmon et al. .................... | 707/4 |

OTHER PUBLICATIONS

U.S. Appl. No. 11/459,923, filed Jul. 25, 2006; Inventors: Shao.
U.S. Appl. No. 11/459,925, filed Jul. 25, 2006, Inventors: Shao.
U.S. Appl. No. 11/459,926, filed Jul. 25, 2006, Inventors: Shao.

* cited by examiner

*Primary Examiner* — Greta L Robinson
*Assistant Examiner* — James J Wilcox
(74) *Attorney, Agent, or Firm* — Michael D. Eisenberg

(57) ABSTRACT

A computer-implemented method for generating, responsive to user input from a user, a set of property results, said set of property results including data pertaining to one or more properties, the computer-implemented method comprising: (a) receiving the user input, the user input including one or more text strings; (b) checking the one or more text strings against one or more references to find one or more changeable text strings, the one or more references including a real estate dictionary; (c) forming one or more search criteria using one or more transformed terms, the one or more transformed terms pertaining to the one or more changeable text strings; and (d) searching in one or more databases using the one or more search criteria to produce the set of property results, the one or more databases include one or more property databases.

20 Claims, 13 Drawing Sheets

Real Estate Service System

Property Searching Method using Property and Extrinsic Databases

| Degrees of Preference [320] |
|---|
| must have<br>nice-to-have<br>don't care<br><br>or<br><br>very important<br>important<br>somewhat important<br>not important |

| Requirements [300] |
|---|
| ☐ number of bedrooms<br>☐ number of bathrooms<br>☐ minimum and maximum square footage<br>☐ minimum and maximum purchase price<br>☐ minimum and maximum of lot sizes<br>☐ number of stories<br>☐ architecture styles of the properties<br>☐ existence of family room<br>☐ existence of formal dining room<br>☐ existence of other types of rooms (such as media room, recreational room, wine cellar, storage room, laundry room, bonus room)<br>☐ existence and types of air conditioning and heating systems<br>☐ existence and type of garage and parking<br>☐ existence and type of swimming pool<br>☐ minimum and maximum age of the property, and<br>☐ date before and date after of when the listing came on the market, i.e. when entered into the MLS or other similar system. |

| Lifestyle Preferences [310] |
|---|
| ☐ proximity to and number of restaurants<br>☐ proximity to and number of coffee shops/café<br>☐ proximity to and number of grocery shops<br>☐ proximity to and number of public parks<br>☐ proximity to and number of libraries<br>☐ proximity to and number of gourmet food stores<br>☐ zip code the preferred areas<br>☐ names or codes of school district<br>☐ proximity to and number of public transportation stops, such as bus stops, subway stops, train stops, etc., and<br>☐ proximity to and number of highway transportation and exits. |

FIG. 3
Requirements and Preferences

Matching Processor

Matching Score Process

Evaluating a Subject Property

Selecting of Comparing Properties

Open House Tour
Generation Process

Market Information Generation

Open House Database preparation

Single-Line Search Interpreter

House Search Results and Ranking
1. 1202
2. 1204
3. 1208
4. 1206
5. 1214
6. 1212
: :
: :

House Search Results and Ranking
1. 1206
2. 1208
3. 1204

House Search Results and Ranking
1. 1206 (+Office; +Park)
2. 1208 (+Office)
3. 1204 (+Office; -Gas station)

STRING-BASED SYSTEMS AND METHODS FOR SEARCHING FOR REAL ESTATE PROPERTIES

PRIORITY APPLICATIONS

This application claims priority under 35 USC 119(e) to a commonly owned provisional patent application entitled "AUTOMATED REAL ESTATE SHOPPING SYSTEM", Application No. 60/702,737, filed Jul. 25, 2006, and to a commonly owned provisional patent application entitled "METHOD AND APPARATUS FOR DATA ANALYSIS AND GRAPHICAL DISPLAY OF GENERALIZED REAL PROPERTY NEIGHBORHOOD INFORMATION", Application No. 60/730,940, filed Oct. 26, 2005, incorporated by reference herein.

RELATED APPLICATIONS

This application is related to the following co-pending patent applications, which are commonly owned, filed on even date herewith, and incorporated herein by reference.

"SYSTEMS AND METHODS FOR EVALUATING REAL ESTATE PROPERTIES", application Ser. No. 11/459,923, filed Jul. 25, 2006, now Abandoned;

"SYSTEMS AND METHODS FOR GENERATING OPEN HOUSE INFORMATION", application Ser. No. 11/459,925, filed Jul. 25, 2006, now Abandoned; and "SYSTEMS AND METHODS FOR REAL ESTATE PROPERTY VALUATION", application Ser. No. 11/459,926, filed Jul. 25, 2006, now Abandoned.

FIELD OF INVENTION

The present invention generally relates to real estate services. More particularly, the present invention relates to systems and methods for computer-implemented real estate services.

BACKGROUND

The residential real estate industry in the US has $1.6T in annual sales and $60B in annual gross brokerage commissions. The residential real estate brokerage industry has traditionally been very labor intensive, and the industry relies heavily on individual real estate agents working as independent contractors to provide services and to manage business transactions. Although information technology has been utilized in the industry, there are still problems such as: (a) inefficient real estate search, (b) unintuitive user interface for real estate search, (c) scattered open house information, and (d) inefficient real estate evaluation. The problems are described below.

(a) Inefficient Real Estate Search

Typically, when searching for real estate properties (hereinafter properties) on the market, an agent or prospective buyer would access a Property Information Database (PID) or one or more other databases that store syndicated information from the PID. PID systems are individually owned by local Realtor associations, and they include some basic data for each listed property. When a real estate agent obtains an agreement to sell a property, the agent (called a listing agent) usually puts information about that property into a PID system immediately so that other agents can view that information through the Internet. The completeness and accuracy of the information about a property on the market depends on what data the listing agent inputs. Frequently, the information in the PID is not accurate, or some pertinent information is missing. The inconsistent availability of data presents a challenge for the real estate agent trying to serve prospective buyers, and for the prospective buyers themselves, because they cannot assess the suitability of an inadequately listed property very easily. The prospective buyers will then have to physically visit such properties to evaluate their suitability. This presents a cost and efficiency challenge for both the agents and the prospective buyers.

Further, the PID contains only data that are intrinsic to individual properties, such as address, size, structure, and price. However, there are other extrinsic factors that a prospective buyer needs to or would like to consider when making a buying decision such as, for example and without limitation, surrounding amenities and facilities. FIGS. 12A-D illustrate differences between a conventional search result and a preferred search result. For an illustrative example, FIG. 12 shows houses such as houses 1202, 1204, 1206, 1208, 1212, 1214, and possibly other houses (represented by dotted lines) that meet a prospective buyer's search criteria of intrinsic data. As an example and as illustrated in FIG. 12B, a conventional search result will list all the above houses and many others as long as their data meet the prospective buyer's search criteria. Such a conventional search may list a large number of houses such that the prospective buyer is required to unnecessarily spend much time in skimming through listed data and is prevented from efficient and effective assessment of the houses. The conventional search result may further rank the houses according to their locations, or their distances to office 1232 (or a specified address) and list house 1202 the first, house 1204 the second, and so forth, without considering extrinsic factors.

(b) Unintuitive User Interface for Real Estate Search

In searching for properties, typical computer software programs and Internet websites allow users to enter search criteria by selecting given attributes or typing a keyword or a phrase in a text box.

FIG. 13A illustrates selections of attributes. As shown in FIG. 13A, a user may select the given attributes using a number of methods such as selecting a city from drop-down box 1302, checking boxes such as box 1304 for multiple choices such as property types, clicking on radio buttons such as radio button 1306 for alternative selections such as numbers of bedrooms and bathrooms, entering numbers in text boxes such as text box 1308 for entering data such as price limits, etc. However, these methods require the user to unnecessarily and discretely go through many menus of options and attributes to enter their selection criteria. Such structured search options limit the user's thinking and do not provide an intuitive way for the user to think about the kind of real estate properties that the user himself/herself is really looking for.

FIG. 13B illustrates a text box, in which the user may type a keyword such as "post office" as a criterion for searching for a house for which the data in PID contain the keyword (or "post office" in this example). However, a search based on a single criterion may list an unnecessarily large number of real estate properties that meet the criterion and make it difficult for the user to efficiently and effectively find desirable properties. The user may also be allowed to type a logical combination using one or more logic operators such as "AND" and "OR" to provide multiple search criteria. Nevertheless, the logic operators are not intuitive to many users who do not have relevant training.

Again, the typical computer software programs and Internet websites provide searches only in PIDs, which do not include extrinsic factors that are also important for the user's buying decision.

(c) Scattered Open House Information

Open houses, commonly hosted during Sundays or Saturday afternoons, are times when properties on the market are open to the public for viewing. Prospective buyers, sellers, neighbors, or agents view the properties at these open houses. There exists a problem in communicating to the public when and which properties are holding open houses during a particular weekend.

There are several ways that sellers currently give notice of their open houses. A seller or agent can advertise in local or regional newspapers, put the information on the local PID board, put the information directly into the marketing comments in the PID that can be viewed by the public or by the agents, place broker advertisements that include property information as well as open house information, or disperse specific printed or online materials that individual real estate agents put together. Sometimes, open house information is not publicly available, and is thus only obtainable by calling the listing agent. Given scattered or even unavailable sources, end consumers, i.e. the prospective buyers, cannot easily access open house information. There currently exists no streamlined way for buyers to find a comprehensive list of the open houses for a particular Sunday, for example. A buyer would have to consult multiple sources to extract that information. Such a labor-intensive approach is neither efficient nor reliable.

Further, useful information generated during open house tours are not efficiently and sufficiently collected. A typical open house tour process that agents or prospective buyers follow includes reviewing currently available listings of open houses, selecting suitable properties for viewing, locating these properties on maps, getting driving directions for the tour, physically visiting these properties, viewing the various neighborhoods surrounding these properties, recording personal impressions and other information about properties either mentally or on paper or other electronic means, and finally identifying particular homes in which the buyers maybe interested. Often when the buyers view the properties on open house tours on their own, the agents working with them do not get the information on how and why the buyers like or dislike about these properties. That information could be very important for the agents in the future to help identify the properties that may be appropriate for their clients, but existing practices do not allow agents to exploit such information.

(d) Inefficient Real Estate Evaluation

There can be hundreds of residential properties that become available on the market in a week in a particular city. Prospective buyers and real estate agents typically have to evaluate these homes to see if they are suitable candidates for purchase, and also to figure out whether these properties are of good values. This task of evaluating whether a specific property is of good value involves very complicated and time-consuming task of comparing this property against personal preferences, previously sold homes and their prices, currently available homes and their offered prices, housing and other financial trends, etc. This task currently is handled manually by the particular prospective buyers or real estate agents, and to do this accurately, one needs to process a lot of data. This manual processing of data can become a prohibitively time-consuming task if one chooses to consider a large number of properties.

One of the most important criteria for prospective buyers in selecting properties is whether the property is attractively priced. To figure out whether a property is attractively or cheaply priced, the buyer needs to seek professional help from appraisers and real estate agents. The process is very time consuming and expensive, and therefore most often buyers cannot easily screen for well-priced properties. When a large number of properties are on the market, the buyer may therefore miss out on good deals, because he cannot readily and cost-effectively identify the for-sale properties that offer the most value.

In light of the above, there is a need in the art for one or more methods or apparatuses that solve one or more above-identified problems. In light of the above, there is a need in the art for one or more methods or apparatuses that solve one or more above-identified problems pertaining to unintuitive user interface for real estate search.

SUMMARY

One or more embodiments of the present invention solve one or more above identified problems. In particular, one embodiment of the present invention involves a computer-implemented method for generating, responsive to user input from a user, a set of property results, said set of property results including data pertaining to one or more properties, the computer-implemented method comprising: (a) receiving the user input, the user input including one or more text strings; (b) checking the one or more text strings against one or more references to find one or more changeable text strings, the one or more references including a real estate dictionary; (c) forming one or more search criteria using one or more transformed terms, the one or more transformed terms pertaining to the one or more changeable text strings; and (d) searching in one or more databases using the one or more search criteria to produce the set of property results, the one or more databases include one or more property databases.

BRIEF DESCRIPTION OF THE DRAWINGS

FIG. 3 shows illustrative examples of property search requirements, lifestyle preferences, and degree of preferences;

DETAILED DESCRIPTION

One or more embodiments involve a system or method for intelligently searching for commercial or residential real estate properties (hereinafter a 'real estate property' being used interchangeable with 'property'). The residential real estate properties may consist of only single family residences. As described herein, the system or method involves receiving search criteria input from a User, who can be a real estate buyer, a real estate agent, a real estate seller, an administrative assistant, or any other person interested in ranking for-sale commercial or residential real estate properties according to his or her preferences. The User's search criteria are received and processed by a Processing Unit. The Processing Unit also receives data from PID residential real estate listing databases, as well as other data from other new or existing databases to augment the information contained in the PID listings. The Processing Unit contains a Matching Processor, which ranks the available properties according to the user's search criteria, the data contained in the PID listing for each for-sale property, and data pertinent to the neighborhood surrounding each for-sale property gleaned from the PID databases and/or other databases containing data related to real estate buyers' preferences. In accordance with one or more embodiments of the present invention, the Matching Processor tabulates a matching score for each property, wherein the matching score depends not only on data directly related to that property itself, but also data related to other properties near that ranked property and other data related to the neighborhood surrounding that ranked property. The unique aspects of this method cannot be fully elucidated in this capsule view, and further exemplary details are described in connection with several figures in the paragraphs below.

Figure 1:
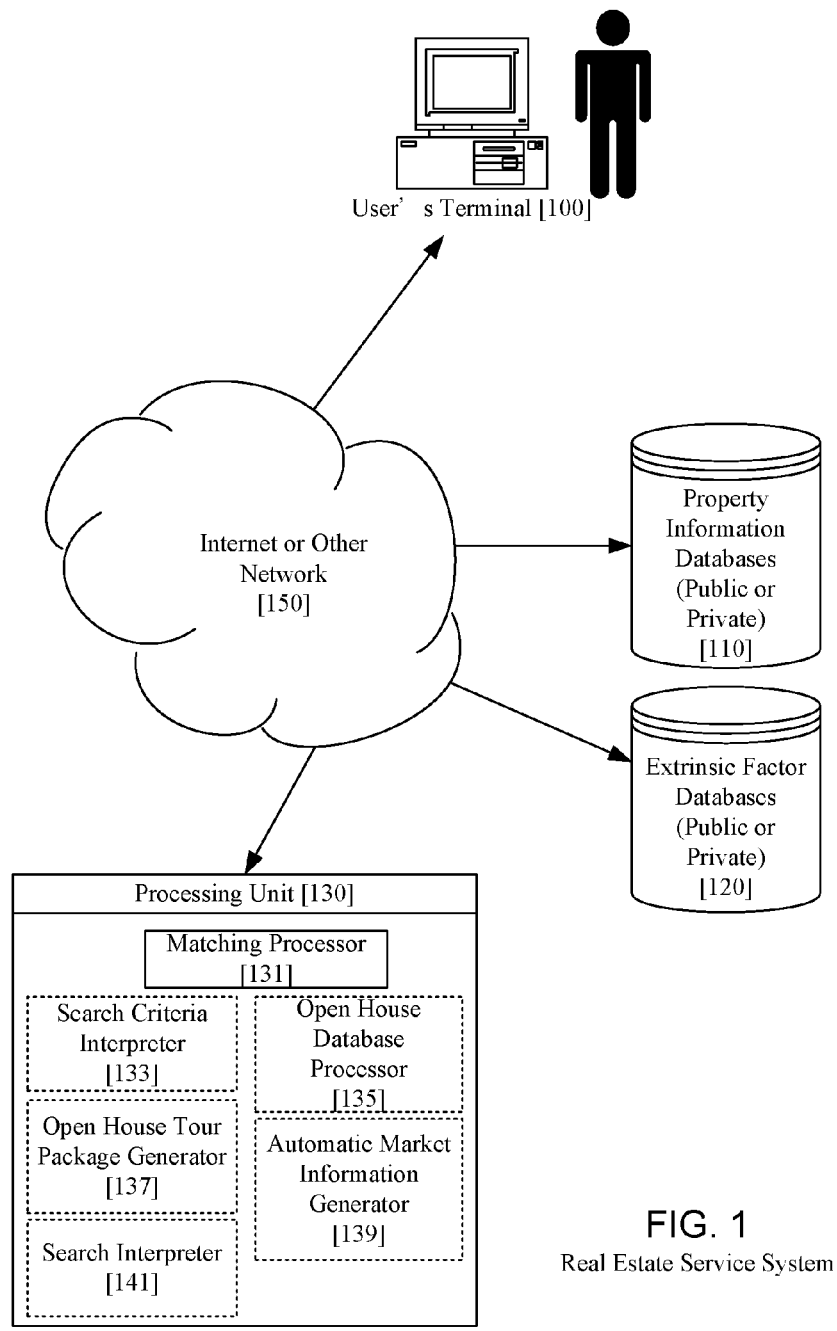
FIG. 1 shows a schematic representation of a system, configured in accordance with one or more embodiments of the present invention, for searching for residential real estate properties (hereinafter properties) in one or more databases based on a user's or a client's preferences.

FIG. 1 shows a schematic representation of a system configured in accordance with one or more embodiments of the present invention, at a high level of generality. A User accesses the system by way of a User's Terminal 100. In accordance with one or more embodiments of the present invention, the User's Terminal 100 is a personal computer or another home computing device. The User may interface with the remainder of the system through the User's Terminal 100 for example and without limitation via an Internet web browser, or by using a client software application loaded on the computer comprising the User's Terminal 100. In any case, the User's Terminal 100 is connected to a computer network, such as the Internet 150. In accordance with one or more embodiments of the present invention, the User's Terminal 100 communicates with the Internet or Other Network 150 through networking equipment such as modems or Ethernet switches. These networking communications typically are performed via standard technologies such as TCP/IP. Via this network connection, the User's Terminal 100 is further connected to one or more Processing Unit(s) 130. The Processing Unit(s) 130 (as described below) is preferably hosted behind a security gate of firewalls and potentially a De-Militarized Zone. Also connected to the Processing Unit(s) 130 via a network such as the Internet 150 are one or more Property Information Databases 110 (or Property Databases 110 for short) such as, for example and without limitation, one or more PID residential property listing databases, and one or more Extrinsic Factor Databases 120 (or Extrinsic Databases 120 for short) such as, for example and without limitation, public or private databases containing information about the locations of amenities commonly attractive to home buyers, such as for example schools, public transit, roads, public services, public safety services, cultural attractions, coffee shops, restaurants and the like.

Within the one or more Processing Unit(s) 130 is a Matching Processor 131. In accordance with one or more embodiments of the present invention, the Matching Processor 131 produces a list of for-sale commercial or residential real estate properties according to Requirements, Preferences, and Degrees of Preferences input by the User via the User's Terminal 100. In accordance with one or more such embodiments, the Matching Processor 131 further produces a ranking of the for-sale real estate properties. In producing this ranking, the Matching Processor 131 considers not only data produced by the one or more Property Information Databases 110, but also data from the one or more Extrinsic Factor Databases 120. The process by which the Matching Processor 131 produces this ranking is described below in connection with FIG. 2.

In accordance with one or more embodiments of the present invention, the Processing Unit(s) 130 also contains one or more of the following features: a Search Criteria Interpreter 133 that translates criteria input by the User into a usable form; an Open House Database 135 that integrates and organizes scheduling information for open houses within the Processing Unit(s) 130 so as to be readily accessible by the User; an Open House Tour Package Generator 137 that efficiently generates a schedule of open houses for the User to visit according to the rankings determined by the Matching Processor or other data; an Automatic Market Information Generator 139 that automatically generates timely market data information for particular geographic regions using raw data for home sale prices and other information from one or more databases; and a Single-line Search Engine 141 that interprets users' inputs and intelligently searches for properties. In accordance with one or more embodiments of the present invention, each of these optional features may also exist externally from the Processing Unit(s), and each individually comprises a novel and useful service for residential real estate buyers distinct from any services currently provided by real estate agents or brokers. Each of these optional features is described in more detail in connection with various FIGs. below; this paragraph is merely intended to note that the present invention contemplates the optional inclusion of each of these novel features in some embodiments.

Matching Processor, Match Score Generation Systems, and Methods for Searching for/Evaluating Real Estate Properties (Primarily Pertaining to IGEN-P001)

One or more embodiments of the present invention involve a computer-implemented method for generating property evaluation information. The computer-implemented method comprises: (a) identifying a first property; (b) receiving, responsive to a set of evaluation criteria, related data pertaining to the first property, the related data pertaining to the first property pertains to geographic entities that are related to the first property through geographic proximity; and (c) storing the related data pertaining to the first property such that the related data pertaining to the first property is available to a user when the user queries information pertaining to the first property. The related data may be stored in a non-volatile memory such as, for example and without limitation, hard disk or optical disks for later recall or stored in volatile memory (RAM) for processing is performed in a real-time fashion such as for display or printing. In accordance with one or more such embodiments, at least one of the related data is received from at least one of an extrinsic factor database and a property information database. In accordance with one or more embodiments of the present invention, the geographic entities further relating to the first property through temporal proximity.

In accordance with one or more embodiments of the present invention, the computer-implemented method further comprises: (a) identifying one or more reference properties, the one or more reference properties relating to the first property through geographic proximity; (b) receiving, responsive to the set of evaluation criteria, reference data pertaining to the one or more reference properties, the reference data pertaining to the one or more reference properties pertains to geographic entities that are related to the one or more reference property through geographic proximity; and (c) storing the reference data pertaining to the one or more reference properties such that the reference data pertaining to the one or more reference property is available to the user when the user queries information pertaining to at least one of the first property and the one or more reference properties.

In accordance with one or more embodiments of the present invention, the computer-implemented method further comprises calculating a score for the first property using the related data and the one or more evaluation criteria. In accordance with one or more such embodiments, the score is calculated based on degrees that the related data match the one or more evaluation criteria. The one or more evaluation criteria have different weightings.

In accordance with one or more embodiments of the present invention, the computer-implemented method further comprises calculating reference scores for the one or more references properties using the reference data and the one or more evaluation criteria. In accordance with one or more such embodiments, the computer-implemented method further comprises ranking the first property and the one or more reference properties according to the score and the reference scores. In accordance with one or more embodiments of the present invention, the computer-implemented method further comprises displaying the first property and the one or more reference properties with reference to the score and the reference scores.

Further, one or more embodiments of the present invention involves a system for generating property evaluation, the system comprising: (a) a property database that includes at least a first property; (b) a computer system configured to: (i) receive, responsive to a set of evaluation criteria, related data pertaining to the first property, the related data pertaining to the first property pertains to geographic entities that are related to the first property through geographic proximity; and (ii) store the related data pertaining to the first property such that the related data pertaining to the first property is available to a user when the user queries information pertaining to the first property. In accordance with one or more such embodiments, at least one of the related data is received from an extrinsic factor database.

In accordance with one or more embodiments of the present invention, the computer system is further configured to: (i) identify one or more reference properties, the one or more reference properties relating to the first property through at least one of geographic proximity and temporal proximity; (ii) receive, responsive to the set of evaluation criteria, reference data pertaining to the one or more reference properties, the reference data pertaining to the one or more reference properties pertains to geographic entities that are related to the one or more reference property through geographic proximity; and (iii) store the reference data pertaining to the one or more reference properties such that the reference data pertaining to the one or more reference property is available to the user when the user queries information pertaining to at least one of the first property and the one or more reference properties. In accordance with one or more such embodiments, the computer system is further configure to: (i) calculating a score for the first property using the related data and the one or more evaluation criteria; and (ii) calculating reference scores for the one or more references properties using the reference data and the one or more evaluation criteria. In accordance with one or more embodiments of the present invention, the computer system is further configure to rank the first property and the one or more reference properties according to the score and the reference scores. In accordance with one or more embodiments of the present invention, the computer system is further configure to display the first property and the one or more reference properties with reference to the score and the reference scores.

Figure 4:
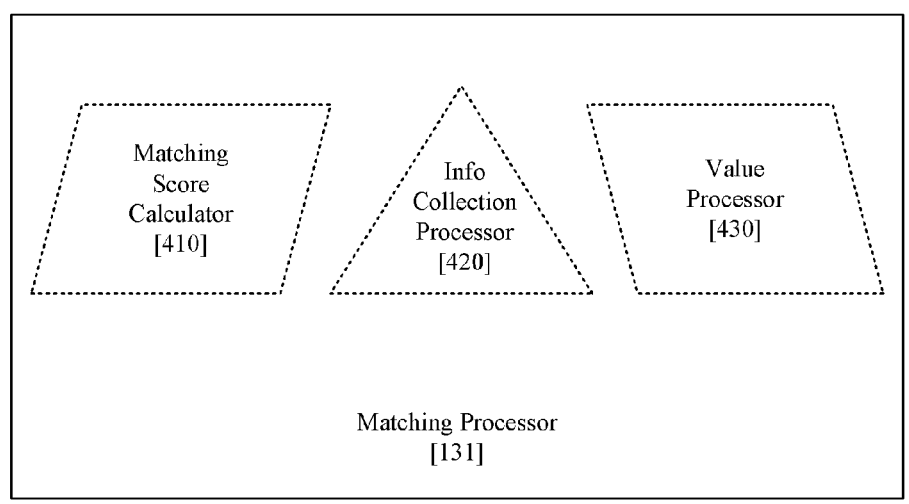
FIG. 4 shows schematic representations of components of a Matching Processor shown in FIG. 1.

FIG. 4 shows schematic representations of components of the Matching Processor 131. In accordance with one or more embodiments of the present invention, the Matching Processor 131 includes a Matching Score Calculator 410, which calculates the degree to which a property suits a buyer 230 based on search criteria such as, for example and without limitation, the Requirements 300, Preferences 310, and Degrees of Preference 320 supplied by the prospective buyer as well as data collected by an Information Collection Processor 420. In accordance with one or more embodiments of the present invention, the Information Collection Processor 420 is a component of the Matching Processor 131 that gathers the data from the Property Listing Databases 110 and Extrinsic Factor Databases 120 described before 210, 214, 216. In accordance with one or more embodiments of the present invention, the Matching Processor 131 includes a Value Processor 430, to be described in further detail below; the Value Processor 430 locates properties among those considered by the Matching Processor 131 that represent considerable values relative to other listed properties.

At the core of this process and system is the one or more Processing Unit(s) 130. For ease of exposition, we will thoroughly describe only one or more embodiments comprising a single Processing Unit 130, though the present invention contemplates the possibility of including a plurality of Processing Unit(s) to carry out one or more of the functions described herein as carried out by a single Processing Unit 130.

In accordance with one or more embodiments of the present invention, the Matching Processor 131 is a key component in the Processing Unit 130. The Matching Processor 131 performs many of the functions that were previously carried out by real estate agents manually reading through the many PID listings and deciding which properties are good potential properties for their clients. The Matching Processor 131 further performs many efficient processes that were never carried out previously. Implemented in accordance with one or more embodiments of the present invention, the Matching Processor 131 provides a significant leap in efficiency in the market for providing services to residential or commercial real estate buyers. It is significant that no one before has realized this leap in efficiency despite the long-standing need in the industry to reduce the dependence on human labor and to increase efficiencies.

One unique aspect of the Matching Processor's 131 capability is that the typical real estate search products that are available in the prior art merely use the information contained in each of the individual PID property listing databases. For example, a typical search would search for properties that are three bedrooms, two bathrooms, and less than $500,000. Such precisely constrained parameters are defined as User Requirements. The searches that are performed by typical prior art search products would search the information in each of the property listings in a PID database to screen out the ones that do not exactly fit these User Requirements. For example, suppose there are three properties listed in a PID or similar database: 7123 Main Street, 7124 Main Street, and 7125 Main Street. A prior art product would review the information contained in the record for 7123 Main Street in the PID or similar database, and determine whether 7123 Main Street has three bedrooms, two bathrooms, and is listed at less than $500,000. The prior art product would essentially answer "yes" or "no" to this question. It would then look at 7124 Main Street and 7125 Main Street, and so on, to determine whether each listed property in the database meets the exact Requirements defined by the User. While the prior art product is reviewing the information on 7123 Main Street, it does not take into account information contained in the 7124 Main Street listing or any other properties' listings. Further, it does not make use of other databases or information resources outside of the particular PID it is searching.

In accordance with one or more embodiments of the present invention, there is provided a computer-implemented method for producing, responsive to user input from a user, a presenting set of property results. The presenting set of property results including data of one or more properties. The computer-implemented method comprises receiving the user input, the user input pertaining to one or more search criteria and searching one or more property databases using the one or more search criteria to produce a intermediate set of property results. The computer-implemented method includes receiving at least one of extrinsic data and intrinsic data, the extrinsic data pertaining to data from one or more databases external to the one or more property databases and pertaining to at least one of the intermediate set of property results. The intrinsic data pertains to data from the one or more property databases and pertaining to other properties within a predefined vicinity of the at least one of the intermediate set of property results, the other properties excluding properties in the intermediate set of property results. The method also includes creating the presenting set of property results using the at least one of the extrinsic data and the intrinsic data.

Figure 2:
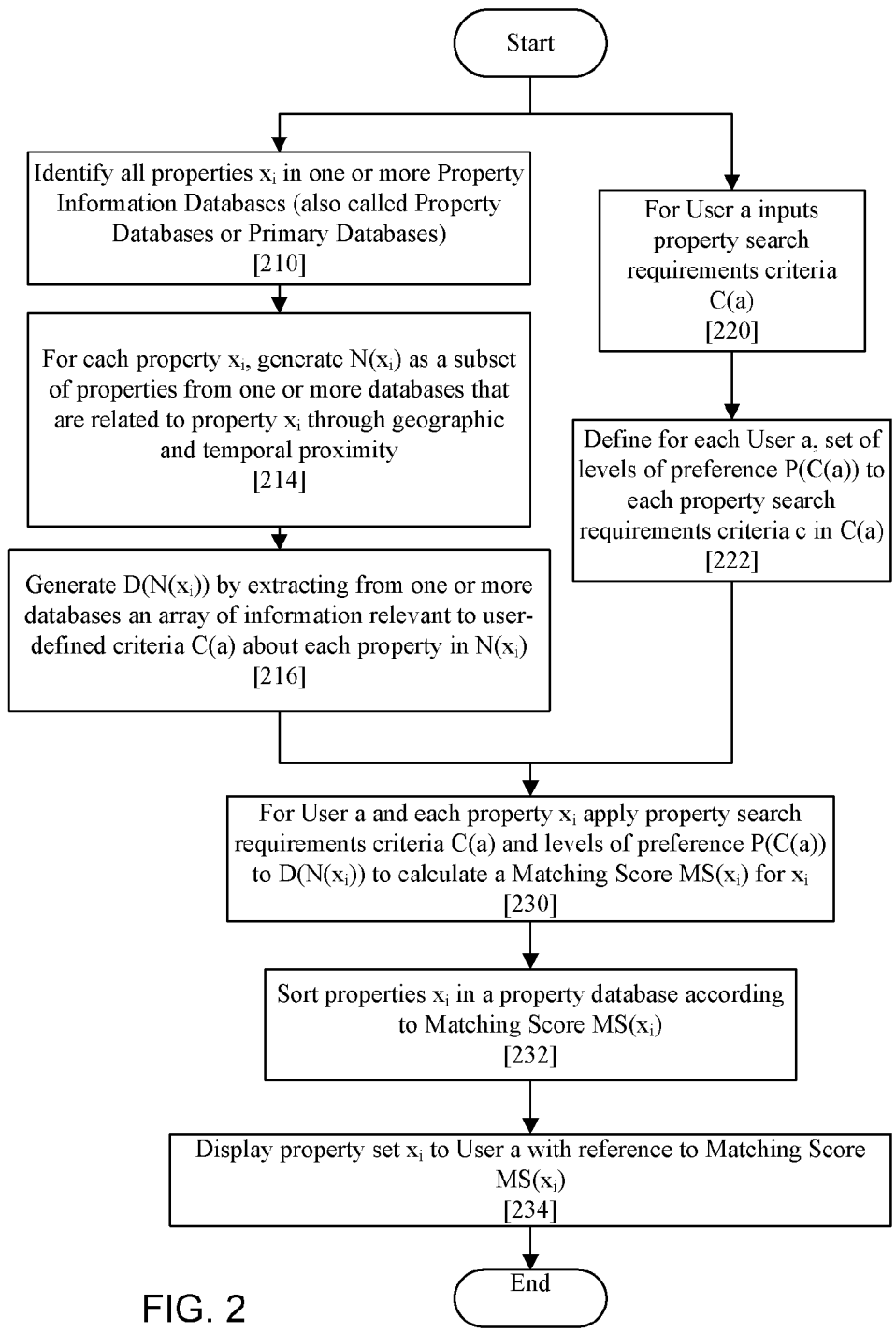
FIG. 2 shows a flowchart of a method, implemented in accordance with one or more embodiments of the present invention, for searching for properties using data from primary (or property) and extrinsic databases.

In accordance with one or more embodiments of the present invention, the Matching Processor 131 uses more than the information contained in these PID databases or other similar kinds of housing listing databases for a particular property listing, as shown in step 210 in FIG. 2. FIG. 2 shows a flowchart of a computer-implemented method, implemented in accordance with one or more embodiments of the present invention, for searching for properties using data from primary (or property) and extrinsic databases using a system such as, for example and without limitation, the Matching Processor 131.

As shown in FIG. 2, the method includes: (a) as illustrated by steps 220 and 222, receiving user input, the user input pertaining to one or more search criteria; (b) as illustrated by step 210, searching one or more property databases using the one or more search criteria to produce an intermediate set of property results; (c) as illustrated by step 214, receiving at least one of extrinsic data and intrinsic data, the extrinsic data pertaining to data from one or more databases external to the one or more property databases and pertaining to at least one of the intermediate set of property results, the intrinsic data pertaining to data from the one or more property databases and pertaining to other properties within a predefined vicinity of the at least one of the intermediate set of property results, the other properties excluding properties in the intermediate set of property results; and (d) as illustrated by step 216, creating a presenting set of property results using the at least one of the extrinsic data and the intrinsic data. As illustrated by step 234, in accordance with one or more embodiments of the present invention, the method further includes: (a) gathering data pertaining to the presenting set of property results; and (b) configuring said data pertaining to said presenting set of property results into a displaying set of property results for displaying on an electronic display. Further, in accordance with one or more embodiments of the present invention, properties in the presenting set of property results are ranked or sorted using at least one of the extrinsic data and the intrinsic data. In accordance with one or more such embodiments, properties in the presenting set of property results are ranked or sorted using at least one of the extrinsic data and at least one of the intrinsic data. In accordance with one or more embodiments of the present invention, the data pertaining to the presenting set of property results comprise information from the extrinsic data.

In accordance with one or more embodiments of the present invention, the intermediate set of property results includes one or more candidate properties. In accordance with one or more such embodiments, the extrinsic data pertain to the one or more candidate properties. Further, in accordance with one or more embodiments of the present invention, the extrinsic data pertain to one or more geographic locations of the one or more candidate properties.

In accordance with one or more embodiments of the present invention, the other properties are within a predefined vicinity of the one or more candidate properties. In accordance with one or more such embodiments, the predefined vicinity is determined by at least one of distances, subdivisions, and zip codes.

In accordance with one or more embodiments of the present invention, the extrinsic data pertain to a geographic location of at least one property in the intermediate set of property results.

In accordance with one or more embodiments of the present invention, the extrinsic data are extrinsic to structures of properties in the intermediate set of property results. Further, in accordance with one or more embodiments of the present invention, the extrinsic data are extrinsic to prices of properties in the intermediate set of property results.

In accordance with one or more embodiments of the present invention, the predefined vicinity is determined by at least one of distances, subdivisions, and zip codes.

In accordance with one or more embodiments of the present invention, the step of creating includes employing an intelligence to refine the intermediate set of property results, the intelligence including one or more filtering criteria that are not directly received from the user, but stored in a system that implements the method such as, for example and without limitation, the Processing Unit 130.

In accordance with one or more embodiments of the present invention, the creating employs the extrinsic data without employing the intrinsic data. Alternatively, in accordance with one or more embodiments of the present invention, the creating employs the intrinsic data without employing the extrinsic data. Further, in accordance with one or more embodiments of the present invention, the creating includes refining the intermediate set of property results, and the presenting set of property results represents at least one subset of the intermediate set of property results. Still further, in accordance with one or more embodiments of the present invention, the creating includes extracting further data from the one or more property databases.

In accordance with one or more embodiments of the present invention, the one or more databases external to the property database contain information pertaining to amenities. In accordance with one or more such embodiments, the amenities include at least one of restaurants, parks, recreational facilities, shops, transportations, communications, points of interest, and cultural institutions. Further, in accordance with one or more embodiments of the present invention, the one or more databases external to the property database are not owned by a realtor association.

In accordance with one or more embodiments of the present invention, the intrinsic data include at least one of lot sizes, appraised values, transaction prices, ages, and types.

In accordance with one or more embodiments of the present invention, the intermediate set of property results and the presenting set of property results share a common set of property results, the common set of property results having a first ranking in the intermediate set of property results and a second ranking in the presenting set of property results, the second ranking different from the first ranking, as illustrated in FIGS. 12A-D.

Figures 12A, 12B, 12C, 12D:
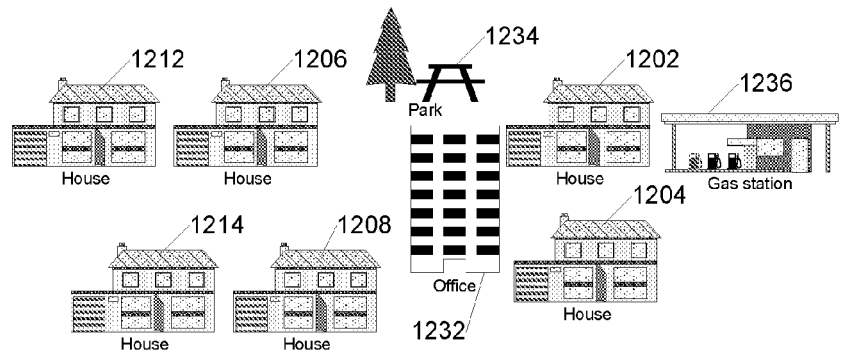
FIGS. 12A-D illustrate a property search result using a prior art method and property search results using methods implemented in accordance with one or more embodiments of the present invention.

As illustrated in FIG. 12A, the intermediate set of property results includes houses 1202, 1204, 1208, 1206, 1214, 1212, and other houses, as would have been provided using a prior art method. On the other hand, as illustrated in FIG. 12C, the presenting set of properties consists of only houses 1206, 1208, and 1204, given extrinsic factors such as park 1234 and gas station 1236 are taken into account. As shown in FIG. 12C, in the presenting set of properties, house 1206 is ranked the first given its proximity to park 1234, and house 1202 is excluded given its proximity to gas station 1236. Contrarily, in a prior art set of properties provided by using a prior art method or the intermediate set of property results, house 1202 is ranked first given that park 1234 and gas station 1236 are not considered. Park 1234 and gas station 1236 illustrate extrinsic factors of which data are stored in one or more extrinsic databases rather than a property database. Requirements or preferences regarding such extrinsic factors may be stored in a client database or input by a user. Referring to FIGS. 12B-C, the common set of properties consists of houses 1206, 1208, and 1204. Further, houses 1206, 1208, and 1204 have different (or reverse) rankings in the intermediate set of properties shown in FIG. 12B and the presenting set of properties shown in FIG. 12C. In accordance with one or more embodiments of the present invention, in addition to information in the presenting set of properties, the displaying set of properties further include relevant extrinsic factors for the prospective buyer's reference, as illustrated in FIG. 12D.

Referring back to FIG. 2, in accordance with one or more embodiments of the present invention, the method includes using relevant extrinsic information that is contained in other related or even unrelated databases, as illustrated in step 214. These databases contain information that may be relevant to the User's home buying preferences but that are extrinsic to the structure or cost of the individual property under scrutiny. For example, if a property of interest is 7123 Main Street, Smalltown, Calif., then at step 210 the Matching Processor 131 will use the information contained in a PID database or a similar property listing database for that property, as well as at step 214 use relevant extrinsic information such as, for example and without limitation, information on other properties on that street (such as 7124 Main Street and 7125 Main Street) and neighboring streets in similar databases such as the same PID database; public county tax information datasources; and/or other databases. Since home buyers' preferences for houses typically are strongly affected by the neighborhood, the data contained in the listings for 7124 Main Street and 7125 Main Street, as well as properties on neighboring streets provide valuable information for the consideration of 7123 Main Street. Data that are contained in the database listings for 7124 Main Street, 7125 Main Street, and neighboring properties that are relevant may include but are not limited to home prices, house sizes (e.g., square footage), lot sizes, quality of the houses contained in the description, ages of the houses, styles of the houses, marketing descriptions of the houses, construction quality and external finish of the houses, etc.

In addition, other extrinsic information relevant to the location of the property of interest (e.g., 7123 Main Street) may also be considered at step 214. For example, the Matching Processor 131 will use information contained in one or more Extrinsic Factor Database 120 to search for surrounding amenities such as for example restaurants, coffee shops, grocery stores, parks, schools, cultural institutions, highway entrances and exits, bus stops, subway stops, train stops, etc. At step 214, the Extrinsic Factor Databases 120 used to generate this information can include, for example, points of interest databases such as Microsoft Mappoint service, Mapquest, Google Maps, and other similar databases. Extrinsic data may also be obtained from a combination of specialized databases, such as yellow page and white page databases for a particular local area, public government databases such as those that show the locations of schools, and parks, etc., or even from proprietary databases that collect and store information on such extrinsic factors from various sources and make that information accessible to the Matching Processor 131.

In accordance with one or more embodiments of the present invention, the extrinsic data on points of interests (restaurants, coffee shops, grocery stores, parks, schools, public transportation, etc.) are stored in a database within the Processing Unit 130 itself. The types of information that are stored in the database may include the name of the establishment, the category of point of interest (such as "restaurant", coffee shops, etc.), or the address of the point of interest, the longitude and latitude of the point of interest. In accordance with one or more embodiments of the present invention, these data are not stored in the Processing Unit 130, but the Processing Unit 130 retrieves the information in real-time as required. During the Matching Processor's 131 functioning, the Processing Unit 130 would connect through a network process such as web services, FTP communications, database synchronization, or other technologies to seek the relevant calculations from other databases or other resources available through the Internet or any other network.

At step 216, a specific set of information that is relevant to user-defined criteria C(a) received at step 220 is extracted from this large set of information collected at step 214, and the resulting set of data is called D(N(xi)).

The various pieces of extrinsic information accessed or received by the Matching Processor 131 at step 216 are useful for one or more of the three purposes: 1) used for determining whether a particular piece of property is desirable; 2) used for determining the estimated property market value of a particular piece of property because the availability of neighboring amenities contributes to the desirability and therefore market price of a residence; 3) stored in a database within the Processing Unit 130 for calculating in the future whether there are good matches between particular properties and other users' search criteria.

In accordance with one or more embodiments of the present invention, the use of these pieces of extrinsic information by the Matching Processor 131 is described below as part of step 230 for calculating a matching score for each property listing that is to be searched.

Matching Score

Referring to FIGS. 2-3, in accordance with one or more embodiments of the present invention, at step 220 the Matching Processor 131 receives as input the Requirements 300, Preferences 310, and Degrees of Preference 320 of a prospective buyer. These data types are illustrated by way of example in FIG. 3. The Requirements 300 data that is received as input at step 220 may include one or more of basic requirements such as, for example and without limitation: number of bedrooms, number of bathrooms, minimum and maximum square footage, minimum and maximum purchase price, minimum and maximum lot size, number of stories, architecture style of the property, existence of family room, existence of a formal dining room, existence of other types of rooms (such as media room, recreational room, wine cellar, storage room, laundry room, bonus room), existence and types of air conditioning and heating systems, existence and type of garage and parking, existence and type of swimming pool, minimum and maximum age of the property, and date before and date after of when the listing came on the market, i.e. when entered into the PID or other similar system.

The Lifestyle Preferences 310 data that is received at step 222 or 220 as input may include one or more of other non-house-related, but consumer or commercial lifestyle- and preference-related information such as, for example and without limitation: proximity to and number of restaurants, proximity to and number of coffee shops/café, proximity to and number of grocery shops, proximity to and number of public parks, proximity to libraries, proximity to and number of gourmet food stores, zip code of preferred areas, names or codes of school district, proximity to and number of public transportation stops, such as bus stops, subway stops, train stops, etc., and proximity to and number of highway transportation entrances and exits.

These Requirements 300 and Preferences 310 are collected in conjunction with Degrees of Preference 320 from the prospective buyer or stored in a client database at step 222. For example, the User can specify that the 3-bedroom requirement is a "must have" while the close-to-restaurants requirement is a "nice-to-have" feature at step 222. The Degrees of Preference 320 can be for example "must have," "nice-to-have," and "don't care." Or, in an alternative embodiment, "very important," "important," "somewhat important", and "not important" might represent the possible Degrees of Preference 320. These alternatives are merely presented as illustrative examples; the present invention contemplates any number and range of possible Degrees of Preference 320.

Referring to FIGS. 2-3, The Matching Score calculated at step 230 is a number that indicates how close a match a particular property is to a consumer buyer's Requirements 300, Preferences 310, and Degrees of Preference 320. At step 234, the consumer buyer can then view a displaying set of properties in an order that is arranged at step 232 according to the degree of matching, as indicated by the Matching Score calculated at step 230. This is not done in prior art product or services, as they all list the properties in the order or some other physical parameters, such as the number of bedrooms, number of bathrooms, the listing date, the square footage, or the price of the properties.

Figure 5:
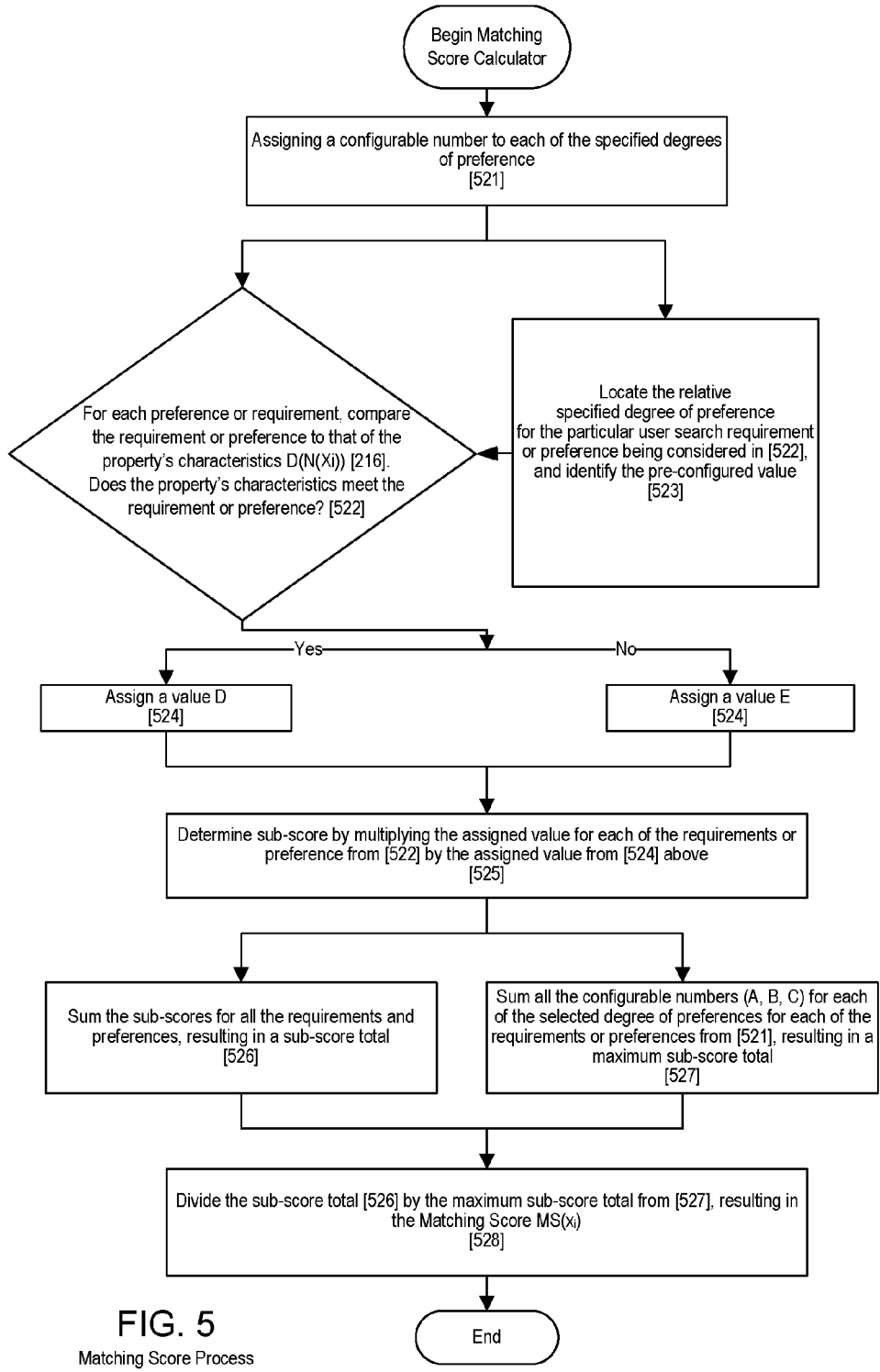
FIG. 5 shows a flowchart of a method, implemented in accordance with one or more embodiments of the present invention, for calculating a Matching Score for use in searching for properties.

As illustrated in FIG. 5, The Matching Score is calculated using a Matching Score Process. This process takes as inputs the buyer's Requirements 300, Lifestyle Preferences 310, and Degrees of Preference 320 (shown in FIG. 3), the data in the Information Collection Processor 420 (shown in FIG. 4), and some configurable multipliers for each of the preference and requirement parameters. These configurable multipliers can be adjusted from time to time according to empirical finding of the accuracy of the Matching Score.

In accordance with one or more embodiments of the present invention, as shown in FIG. 5, the Matching Score Process includes:

at step 521, assigning a configurable number to each of the specified Degrees of Preference 320, such as "must have/very important"=A, "nice-to-have/somewhat important"=B, "don't care/not important"=C;

at step 522, comparing a user's Requirements 300 (shown in FIG. 3) or Lifestyle Preferences 310 (shown in FIG. 3) to characteristics of the property. For example, it compares the buyer's requirement of >=3 bedrooms and that the property having 4 bedrooms;

at step 523, locating and determining the relative specified degree of preference received at step 222 (shown in FIG. 2) for the particular Requirements 300 or Lifestyle Preferences 310 specified at step 522, and identifying the value assigned at step 521;

at step 524, determining whether the property's characteristics $D(N(xi))$ generated at step 216 (shown in FIG. 2) meets the Requirements 300 or Lifestyle Preferences 310 defined at step 522, and assigning a value D to the characteristics that do, and value E to the characteristics that do not;

at step 525, determining the sub-score by multiplying the value assigned at step 523 for each of the Requirements 300 or Lifestyle Preference 310 from step 522 by the assigned value D or E from step 524 above;

at step 526, summing the sub-scores for all the Requirements 300 and Lifestyle Preferences 310, resulting in a sub-score total;

at step 527, separately, summing all the configurable numbers (A, B, C) for each of the selected Degrees of Preference 320 for each of the Requirements 300 or Lifestyle Preferences 310 from step 521 above, resulting in a maximum sub-score total;

at step 528, dividing the sub-score total from step 526 by the maximum sub-score total from step 527, resulting in the Matching Score $MS(xi)$.

The Matching Processor 131 and a method, implemented in accordance with one or more embodiments of the present invention, for searching for real estate properties may functionally solve the problem of typical Internet searching systems that only a few variables are taken into account to provide results that fit into all selection criteria. Instead, in accordance with one or more embodiments of the present invention, users are provided a list of properties with indications as to how close these are to what the users are looking for.

This method is unique in that it predicts how close the match is of a particular subject to the wants and needs of a particular real estate buyer. The products and services available through the prior art typically merely show a list of the properties, without estimating how close those are to the real estate buyers' wants and needs, nor do they take into account other Lifestyle Preferences 310.

Further, advantages of one or more embodiments of the present invention are believed to include significant improvement in efficiency and effectiveness of real estate property data search. Specifically, unlike prior art methods or services provided by prior art systems, users do not need to unnecessarily browse through a great amount of irrelevant data, and prospective buyers' lifestyle requirements and preferences are taken into account in real estate property searches.

String-Based Systems and Methods for Searching for Real Estate Properties (Primarily Pertaining to IGEN-P005)

As shown in FIG. 1, in accordance with one or more embodiments of the present invention, the Processing Unit 130 includes a Search Interpreter 141, a novel system of user entry system of real estate property search criteria. In accordance with one or more embodiments of the present invention, the Search Interpreter 141 enables users to enter their property search preferences through a natural speech-like phrase or sentence. For example, through the Search Interpreter 141 the user can enter a phrase like "San Francisco Noe Valley 3 bd 2 ba<$1000000 remodeled kitchen large lot close to restaurants". Relevantly, a property searching method which is implemented in accordance with one or more embodiments of the present invention allows users to quickly identify properties which they are looking for in an easy and intuitive way.

The Search Interpreter 141 is unique and different from the traditional web search interfaces such as Google search box in that this search capability understands real estate terms and interprets real estate requirements. The Search Interpreter 141 operates on PID's 110 and other Extrinsic Factor Databases 120 rather than web pages. It searches both normalized data fields in databases, and thus needs to translate database normalized information, as well as free flowing text information. It also accesses publicly available databases and sources as well as closed membership-only databases. It also interprets real estate terms and translates them into searches. It also translates geographic sub-areas and comprehends what those areas mean.

Figure 11:
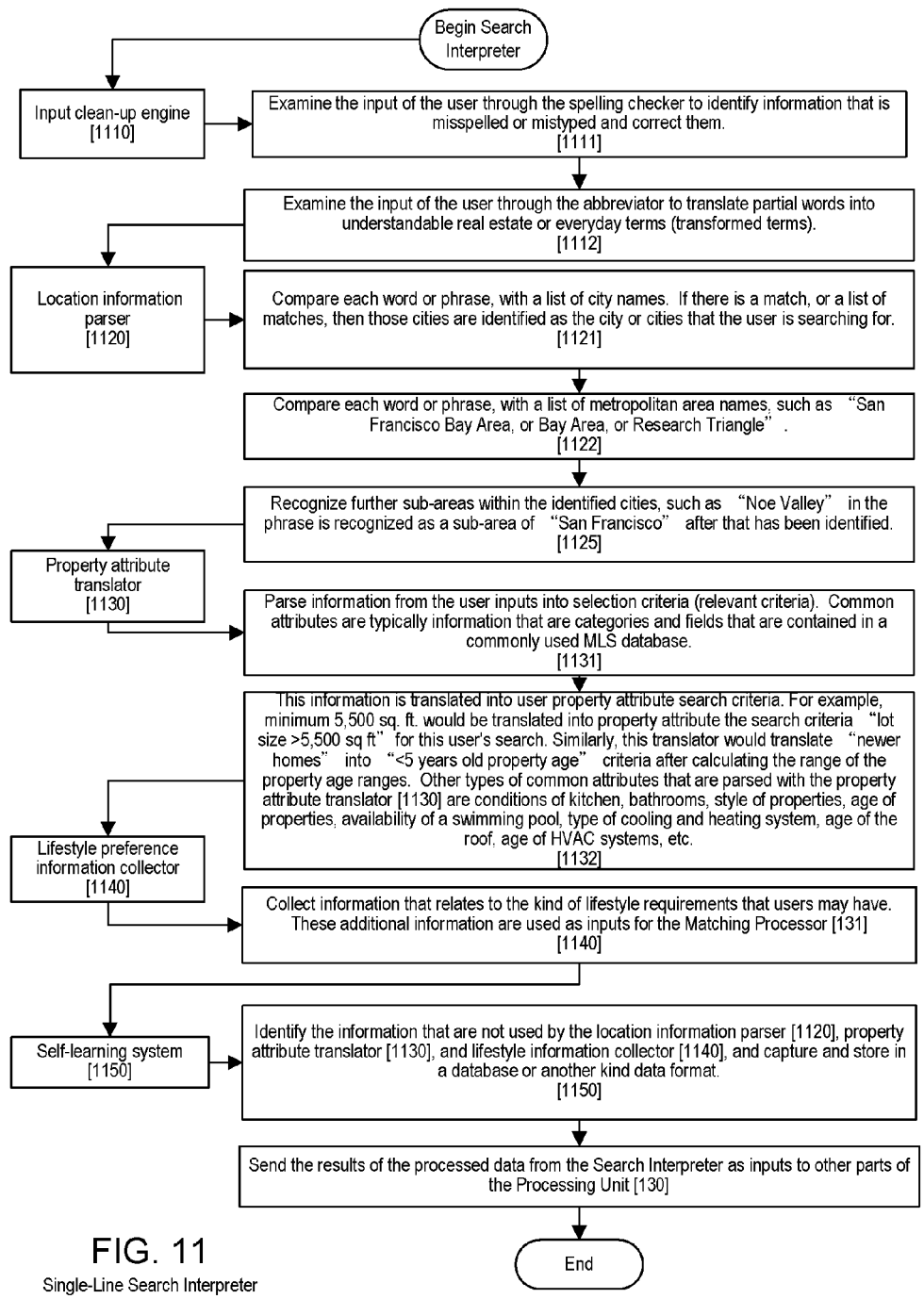
FIG. 11 shows a flowchart of a method, implemented in accordance with one or more embodiments of the present invention, for searching for properties.

In accordance with one or more embodiments of the present invention, the Search Interpreter 141 may include one or more of the following components such as, for example and without limitation: an input clean-up engine 1110, a location information parser 1120, a property attribute translator 1130, a lifestyle preference information collector 1140, and a self-learning system 1150. FIG. 11 illustrates functions of the components and shows a flowchart that illustrates a property searching method that is implemented in accordance with one or more embodiments of the present invention utilizing the Search Interpreter 141.

The input clean-up engine 1110 examines the input of the user through a spelling checker and an abbreviator at step 1111 and step 1112, respectively. At step 1111, the spelling checker identifies information that is typed in and that is misspelled or mistyped and corrects it, such as a user's input of "San Francico" converted into "San Francisco", input of "kitchn" converted into "kitchen", or "Hillsborough, Oreg." converted "Hillsboro, Oreg.". At step 1112, the abbreviator translates partial words such as "bd" into "bedroom", "ba" into "bathroom", "bth" into "bathrooms", "bath room" into "bathroom", "kth" into "kitchen", "sfr" into "single family residence", "R1" into "single family residence", etc. Once the user's input is cleaned up through the clean-up engine 1110, then that information is fed into the location information parser 1120, property attribute translator 1130, and lifestyle information collector 1140.

The location information parser 1120 deduces the property locations that the users are indicating. This parser first locates in the user input phrase whether there are names of particular cities, such as "San Francisco Noe Valley 3 bd 2 ba" being identified with the city "San Francisco". This is done by comparing each word or two to 3 word phrases, with a list of city names at step 1121 and with a list of metropolitan area names at step 1122, examples of metropolitan area names including "San Francisco Bay Area, or Bay Area, or Research Triangle". Once there is a matching, and if it is a city name or a list of city names, then those cities are identified as the city or cities that the user is searching for. If the input is recognized as an area of "Bay Area", then that input is also converted into the appropriate cities, such as in this case, it would be the cities between San Francisco and San Jose including Palo Alto, Menlo Park, Sunnyvale, Mountain View, Santa Clara, Redwood City, San Mateo, Hillsborough, South San Francisco, etc. according to common real estate knowledge of where the common geographic boundaries of these areas are. Once that is done further sub-areas are recognized, such as "Noe Valley" in the phrase is recognized as a sub-area of "San Francisco" after that has been identified. These sub-areas are typically a part of a larger city, and they typically contain a certain kind of neighborhood, with certain styles of properties, and price ranges, and are usually defined by local real estate traditions, and are often available in the PID databases for those areas. Therefore the location information parser 1120 has identified the city or cities, and the sub-area(s), if any, that the users are interested in.

At step 1131, the property attribute translator 1130 parses information from the user inputs into selection criteria (or relevant criteria). Common attributes are typically information that are categories and fields that are contained in a commonly used PID database. In accordance with one or more embodiments of the present invention, if the relevant criteria are not suitable for search, the relevant criteria are translated into one or more search criteria at step 1132. For example, "3 bedroom" translated into ">=3 bedrooms", "2 bathroom" translated into ">=2 bathrooms", "1000000" translated into "<$1,000,000 asking price", "single family home" translated into "property type single family residence", etc. In addition, if some of the information needs to be translated, for instance, "large lot" needs to be translated into a searchable criteria for the database search, the translation can be accomplished by first identifying all the properties in the PID database in the location that are selected by the location information parser 1120 and calculating the minimum of the range of the lot size of the top 25% or another percentage of the properties in the location(s). The above information is translated into user property attribute search criteria. If, for example, the calculated minimum of the range is 5,500 sq. ft., then the translated property attribute search criteria "lot size >5,500 sq ft" would be created for this user's search. Similarly, at step 1132, "newer homes" would be translated into "<5 years old property age" criteria after calculating the range of the property age ranges. Other types of common attributes that are parsed with the property attribute translator 1130 are conditions of kitchen, bathrooms, style of properties, age of properties, availability of a swimming pool, type of cooling and heating system, age of the roof, age of HVAC systems, etc.

The lifestyle preference information collector 1140 collects information that relates to the kind of lifestyle requirements that users may have. The types of information that are important include but are not limited to: proximity of schools, restaurants, coffee shops, parks, grocery stores, gourmet food stores, public transportation stops, and highway exits; the neighborhood type, and level of achievement of the schools in the school district. These pieces of additional information are used as inputs for the Matching Processor 131 (shown in FIG. 1).

The self-learning system 1150 identifies the information that is not used by the location information parser 1120, property attribute translator 1130, and lifestyle information collector 1140. These are words or phases that are entered into the Search Interpreter 141 input field, but is/are not used by any of these components. This system 1150 therefore concludes that the users are inputting information that they want matched to properties, but that the Search Interpreter 141 is not recognizing. These words or phases are recorded for self-learning purposes. They can be captured and stored in a database or another kind of data format, whether electronically or on paper. This information is then used later for future product improvement purposes.

In accordance with one or more embodiments of the present invention, the results of the processed data from the Search Interpreter 141 are then processed to be inputs to the other parts of Processing Unit 130.

Figures 13A, 13B, 13C, 13D:
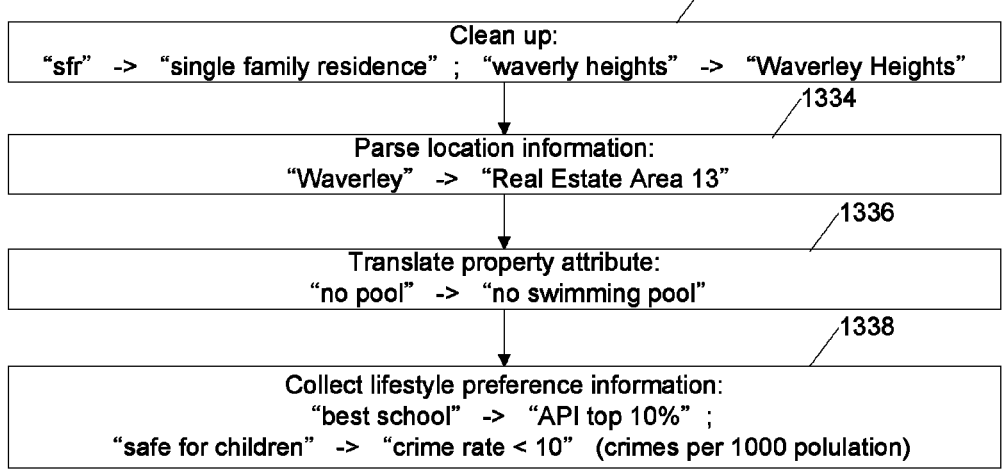
FIGS. 13A-B illustrate prior art user interfaces for property searches, and FIGS. 13 C-D illustrate a user interface and an process for property search in accordance with one or more embodiments of the present invention.

FIGS. 11 and 13C-D illustrate a computer-implemented method, implemented in accordance with one or more embodiments of the present invention, for searching for properties (i.e., real estate properties) using a system such as, for example and without limitation, the Search Interpreter 141. Referring to FIGS. 11 and 13C-D, the method includes: (a) receiving the user input, the user input including one or more text strings that are entered using a user interface such as, for example and without limitation, textbox 1322 (illustrated in FIG. 13C); (b) checking the one or more text strings against one or more references to find one or more changeable text strings, the one or more references including a real estate dictionary, the checking step being illustrated in steps 1111 and 1112 (shown in FIG. 11); (c) changing the one or more changeable text strings into one or more transformed terms if the one or more changeable text strings are found, the changing step being illustrated in step 1332 (shown in FIG. 13D) and steps 1111 and 1112 (shown in FIG. 11); (d) creating one or more search criteria using the one or more transformed terms, the creating step being illustrated in steps 1334, 1336, and 1338 (shown in FIG. 13D) and steps 1121, 1122, 1125, 1131, and 1132 (shown in FIG. 11); and searching in one or more databases using the one or more search criteria to produce the set of property results, the one or more databases include one or more property databases.

In accordance with one or more embodiments of the present invention, the creating step comprising: (a) parsing the one or more transformed terms to find one or more relevant criteria, the parsing step being illustrated in step 1131 (shown in FIG. 11); and (b) translating the one or more relevant criteria into one or more search criteria if the one or more relevant criteria are found, the translating step being illustrated in step 1132 (shown in FIG. 11). In accordance with one or more such embodiments, the parsing step includes identifying one or more measurement units in the user input or the one or more understandable terms. Further, in accordance with one or more embodiments of the present invention, the translating step includes converting one or more abstract terms in the one or more relevant criteria into one or more logical or mathematical representations, the one or more logical or mathematical representations being a subset of the one or more search criteria. Still further, in accordance with one or more embodiments of the present invention, the creating step includes using data from a client database, the client database containing client preference data.

In accordance with one or more embodiments of the present invention, the one or more references further include a language dictionary. In accordance with one or more embodiments of the present invention, the one or more references further include a list, the list comprising one or more of geographical area names, street names, building names, business names, and facility names.

In accordance with one or more embodiments of the present invention, the one or more changeable text strings include at least one of abbreviations, acronyms, symbols, misspelled words, mistyped words, spelling errors, and typographical errors. In accordance with one or more embodiments of the present invention, the one or more changeable text strings include at least one of abbreviations, acronyms, and symbols. In accordance with one or more such embodiments, the at least one of abbreviations, acronyms, and symbols are transformed into one or more search criteria for finding real estate property data by a system such as, for example and without limitation, Search Interpreter 141. While some prior art products and methods are able to correct typographical errors or automatically complete typing for users, these prior art products and methods cannot recognize abbreviations and acronyms, especially abbreviations, acronyms, symbols, and jargons used in the real estate industry.

In accordance with one or more embodiments of the present invention, the method further comprises receiving data from an extrinsic factor database in one or more of the checking, changing, creating, and searching steps, the extrinsic factor database being external to the property database. Further, in accordance with one or more embodiments of the present invention, the method comprises receiving data from a self-learning system in one or more of the checking, changing, parsing, translating, and searching steps, the self-learning system being configured to store intermediate information, the intermediate information including at least one or the one or more understandable terms, the one or more relevant criteria, and the one or more search criteria.

In accordance with one or more embodiments of the present invention, the method further comprises storing unused information into a self-learning system, the unused information being filtered in the creating step.

In accordance with one or more embodiments of the present invention, the method further comprises identifying one or more negative search criteria in the user input or the one or more transformed terms.

In accordance with one or more embodiments of the present invention, the method further comprises: (a) generating one or more additional criteria based on the one or more search criteria; and (b) searching in the one or more databases using the one or more additional criteria to produce an additional set of property results.

In accordance with one or more embodiments of the present invention, the searching step comprises: (a) receiving the one or more search criteria; (b) searching the one or more property databases using the one or more criteria to find one or more intermediate properties; (c) receiving at least one of extrinsic data and intrinsic data, the extrinsic data pertaining to data from one or more extrinsic factor databases external to the one or more property databases and pertaining to at least of the one or more intermediate properties, the intrinsic data pertaining to data from the one or more property databases and pertaining to other properties within a predefined vicinity of the at least of the one or more intermediate properties, the other properties excluding the one or more intermediate properties; and (d) searching one or more of the one or more property and extrinsic factor databases using the at least one of extrinsic data and intrinsic data to generate the set of property results.

The Search Interpreter 141 and the proposed method for searching for real estate properties in accordance with one or more embodiments of the present invention are very useful in that now users do not have to go through many selection boxes to try to check which pieces of information are to be searched. The user can now think about what is important to the user, and then just indicate those items in a phrase or sentence. This interpreter will understand all the common real estate terms and geographic/location-based terms that are used in a user's typical property search process.

Advantages of one or more embodiments of the present invention are believed to include significant improvement in efficiency and effectiveness of real estate property data search. Specifically, one or more embodiments provide an intuitive and simple user interface as well as a fault tolerant and intelligent method for real estate property data search. Unlike prior art methods or services provided by prior art systems, with one or more embodiments of the present invention, users do not need to go through discrete and tedious steps and menus, and the users will find relevant real property data even if they provide unstructured or misspelled criteria, abbreviation, and acronyms as input for the real property data search.

Open House Tour Package Generator, Open House Data Processor, and Methods for Generating Open House Information (Primarily Pertaining to IGEN-P003)

Figure 8:
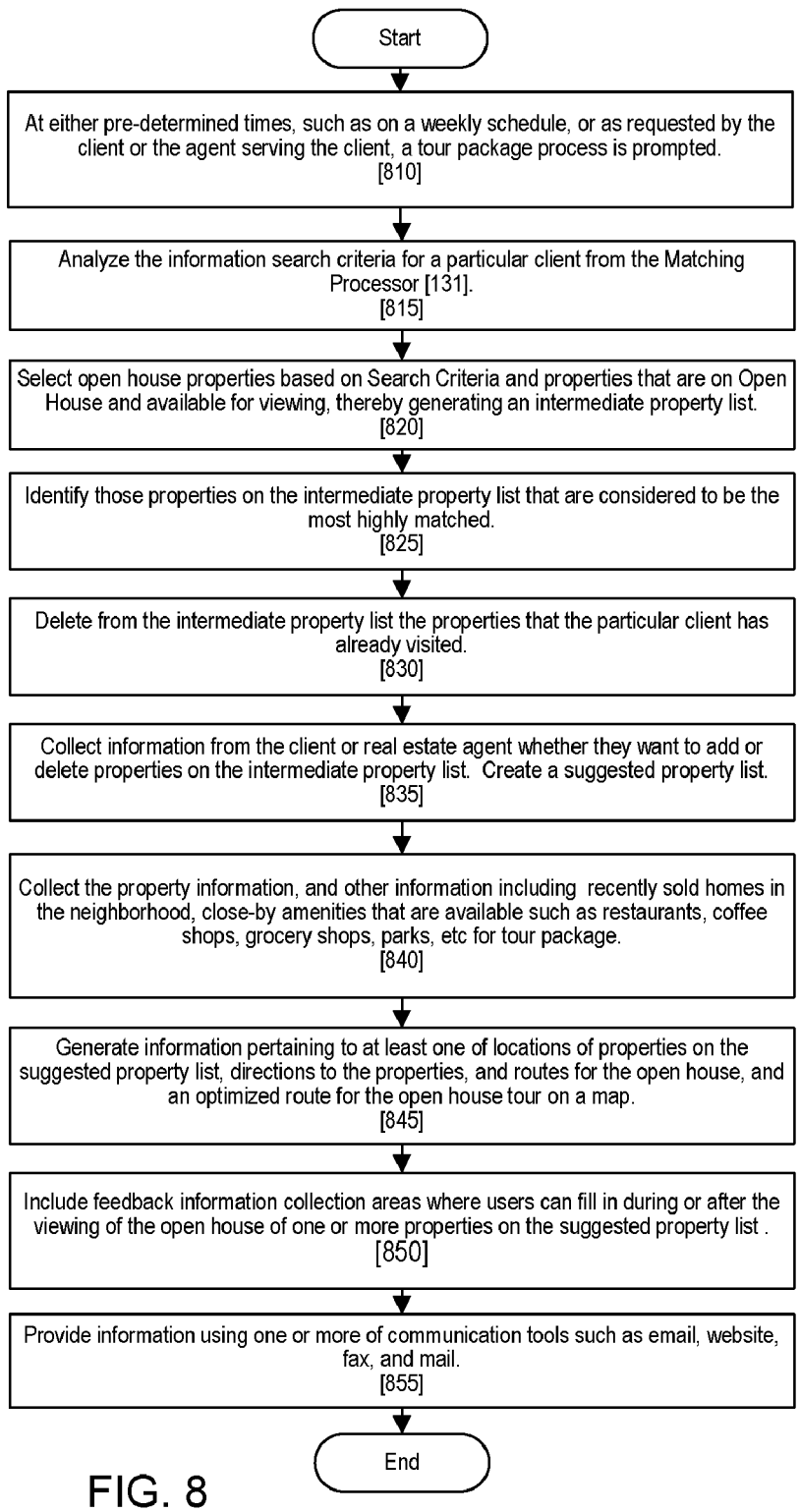
FIG. 8 shows a flowchart of a method, implemented in accordance with one or more embodiments of the present invention, for assisting in planning an open house tour.

In accordance with one or more embodiments of the present invention, the Open House Tour Package Generator 137 (shown in FIG. 1) is an engine that uses an algorithm to generate a list of homes for a particular client's or agent's viewing such that many tasks can be automated. FIG. 8 illustrates an Open House Tour Package Generation Process, or a method, implemented in accordance with one or more embodiments of the present invention, for assisting open hours tour planning using an automated system such for example and without limitation, the Open House Tour Package Generator 137 shown in FIG. 1.

The method starts at step 810. At step 810, at pre-determined times, such as on a weekly schedule, or as requested by a client or a real estate agent serving the client, generation of an open house tour package is triggered. This tour package is generated by an automated system (as exemplified by the Open House Tour Package Generator 137 shown in FIG. 1) that selects properties to be visited either physically or virtually on the Internet, and the package is to include at least one of general property information, property characteristics, location information to aid the client or the agent in driving to and between properties or locating the properties, supplemental information such as information about properties that are sold in the area and other amenities available in the area such as restaurants, coffee shops, grocery shops, parks, public transportation, and other information that the clients or agents would want to have with them on a tour. These pieces of information are in the PID 110 (shown in FIG. 1) and the Extrinsic Factor Databases 120 (shown in FIG. 1). Then, control is transferred to step 815.

At step 815, the Open House Tour Generator 137 (shown in FIG. 1) receives and analyzes search criteria information (i.e., one or more search criteria) for the particular client. Then, control is transferred to step 820.

At step 820, the Open House Tour Generator 137 (shown in FIG. 1) uses the search criteria information to select properties that are on an Open House database and are available for the clients to visit. This search criteria information is input by a user or is automatically fed by the Matching Processor 131. The information about the properties is obtained from the PID 110 (shown in FIG. 1) and Extrinsic Factor Databases 120 (shown in FIG. 1). Additional information is taken from the other property information that is available, such as the information on other properties in the close-by proximity from the PID 110; the public county recorded transaction information, as well as county property tax information. The Open House Tour Package Generator 137 takes the information as stated above and input that into the Matching Processor 131 which computes the suitability of matching of the property to that particular client's search criteria. Out of that, an intermediate property list of properties that are on the market is generated, and this intermediate list is generally much longer than someone can visit in person in an open house tour. Then, control is transferred to step 825.

At step 825, the Open House Tour Package Generator 137 optionally identifies those properties that are considered to be the most highly matched properties as indicated by Matching Scores from the Matching Processor 131. Then, control is transferred to step 830.

At step 830, the Open House Tour Package Generator 137 optionally deletes one or more properties on the intermediate property list of properties. Example of the one or more deleted properties may include the ones that the particular client has already visited at once, remembered from previous open house tour packages and/or other information available from the database. Then, control is transferred to step 835.

At step 835, optionally, the Open House Tour Package Generator 137 further collects information from the client or the real estate agent regarding whether the client or the real estate agent wants to make changes to the intermediate property list, the changes including, for example and without limitation, adding or deleting properties on this list. The changes can be made using Internet web pages, emails, 2-way pagers, telephone response system, or some other medium where the intermediate property list is displayed to the client or agent for selection. As a result, a suggested list property list is created. Then, control is transferred to step 840.

At step 840, the Open House Tour Package Generator 137 packages information pertaining to properties on the suggested property list. The information may include information such as, for example and without limitation, information about the properties themselves, recently sold homes in the neighborhood, close-by amenities that are available such as restaurants, coffee shops, grocery shops, parks, etc. Then, control is transferred to step 845.

At step 845, the Open House Tour Package Generator 137 generates information including information pertaining to at least one of locations of the properties on the suggested property list, driving directions to the properties, routes for the open house tour, and an optimized driving route for the open house tour on a map. Then, control is transferred to step 850.

At step 850, the Open House Tour Package Generator 137 may optionally provide feedback information collection spaces where users can fill in during or after the viewing of the open house of one or more properties on the suggested property list. The feedback information collection spaces may be printed on paper or provided on an electronic device that is used by the client. This is useful to register what the clients like or not like about the properties as well as other comments of the client, and by doing that, the client may be reminded of properties that the client has visited and impressions of the client regarding the properties, and the Matching Processor 131 may further collect information about properties according to the client's preferences. Then, control is transferred to step 855.

At step 855, the Open House Tour Package Generator 137 may provide information pertaining to the suggest property list in one or more of communication tools such as, for example and without limitation, email, website, fax, and mail. This information is packaged in a way that makes printing of such information easy. This can be achieved by aligning the width of the pages on the electronic means such as email or webpage to be similar to the printed paper, as well as paginating the information such that they are logically printed onto separate pages. For example, each property and its related information can be printed on a single page or on multiple pages, while information pertaining to a next property will be printed one or more separate subsequent pages.

The Open House Tour Package Generator 137 and the method describe above significant improves planning for open house tours that typically require a lot of manual processing and thus is very time consuming for the client and the real estate agent. This system not only saves time for the real estate agent, but it now affords the client a much better service because that better and more comprehensive information is provided and packaged together, and that the client can now access this information anytime of the day. The client no longer has to wait for the real estate agent to be available.

Open House Database Processor

In accordance with one or more embodiments of the present invention, as shown in FIG. 1, the Processing Unit 130 includes an Open House Database Processor 135, the Open House Database Processor 135 being configured to capture, process, and display open house information. The Open House Database Processor 135 integrates open house information from many different sources into an open house database internal or external to the Processing Unit 130, and the information is then made available to users via one or more of various media, such as a webpage, voicemails, emails, etc. The open house information includes one or more of property addresses, property information database (PID) listing numbers, time and dates of open house scheduled, special marketing comments that may be available for the particular open house.

Figure 10:
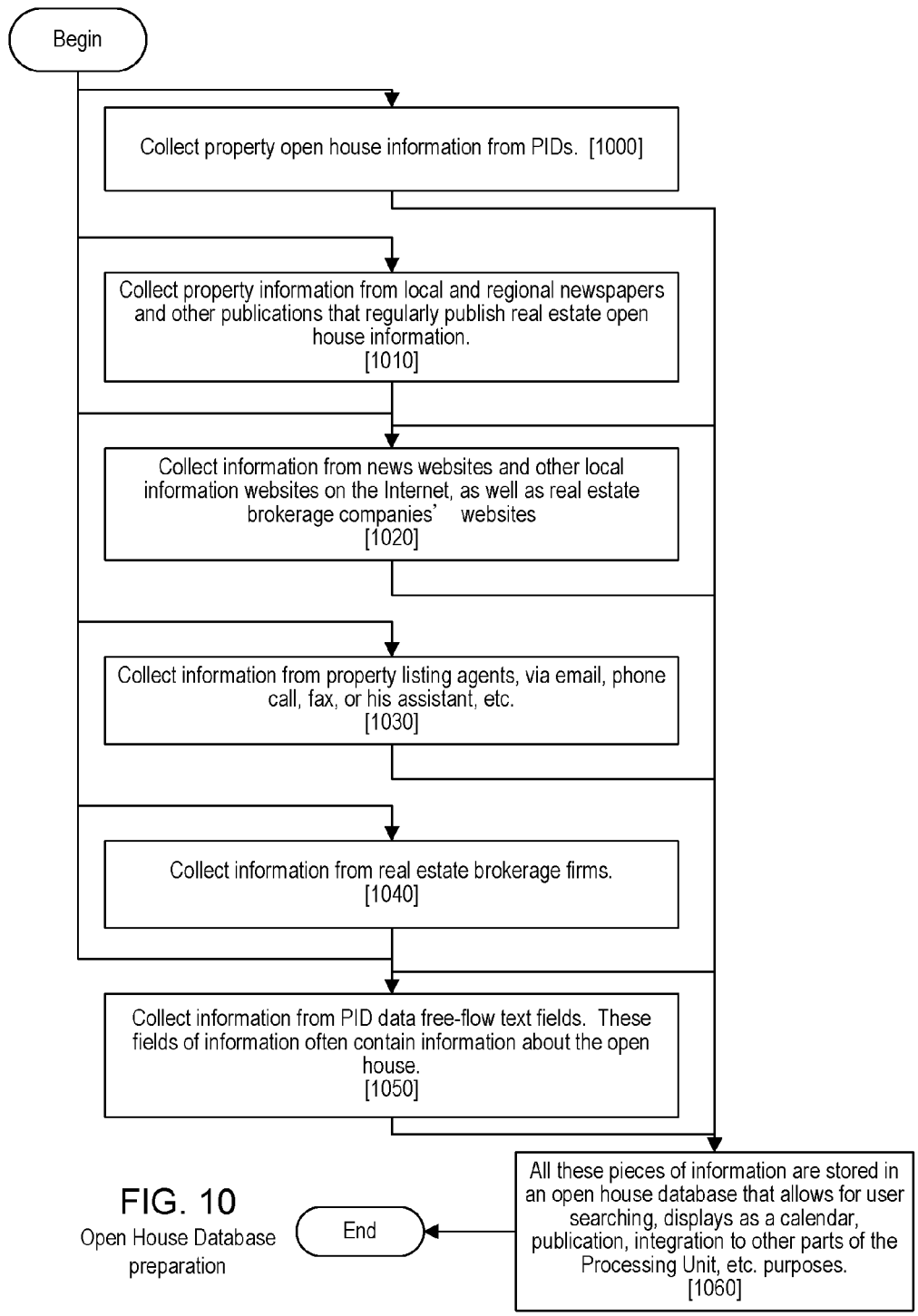
FIG. 10 shows a flowchart of a method, implemented in accordance with one or more embodiments of the present invention, for preparing an open house database.

As shown in FIG. 10, in accordance with one or more embodiments of the present invention, the Open House Database Processor 135 (shown in FIG. 1) integrates data from one or more of various different sources through one or more of different methods into the open house database:

Through method 1000, the Open House Database Processor 135 integrates open house information from property information databases (PIDs). Some PIDs hold the open house information of property listings that they hold. The Open House Database Processor 135 collects such open house information from the PIDs, and the open house information is downloaded into the open house database via various means such as, for example and without limitation, web services, XML data formats, ftp (file transfer protocol) file exchange, TCP/IP, and proprietary data formats that are specifically available for particular PIDs.

Through method 1010, the Open House Database Processor 135 integrates information from paper newspaper and other publications. Local and regional newspaper and other publications often publish real estate open house information, and the open house information is typically published regularly. Open house information is also captured from publications by real estate brokerage firms regarding their agents' listings; such publications often show open house listings. The open house information from above-mentioned paper newspaper and other publications is usually available on a particular day of the week or at a particular time. The open house information can be entered into the Processing Unit 131 by on or more persons through a web interface or a database interface, or can be scanned into the Processing Unit 131 and deciphered using optical character recognition software. Such entering or scanning operations can also be outsourced to a location where it is relatively cost efficient. A copy of open house sections of pages of the newspaper or publication can be faxed or sent via other means to the outsourced location for entering or scanning into the open house database through a communication network.

Through method 1020, the Open House Database Processor 135 integrates open house information from electronic newspaper websites and other web sites on the Internet, the other websites including local, regional, or national real estate brokerage websites, which often publish open house information. The Open House Database Processor 135 also collects open house information that is published electronically on the Internet by various other companies or organizations. To collect the open house information, the Processing Unit 130 (shown in FIG. 1) can emulate as a web browser and sends requests to the websites and in return will get information back as webpages. The Processing Unit 130 can then parse the open house information out from the returned webpages. The open house information is then stored into the open house database.

Through method 1030, the Open House Database Processor 135 integrates open house information from property listing agents. Typically, the person that organizes an open house is a property listing agent or the property listing agent's administrative assistant. In accordance with one or more embodiments of the present invention, an automatic email can be sent to the property listing agent seeking information on whether the listed property is or will be on open house. The receiving property listing agent then responses to the request through an email response, a website answer, a phone call, or one of other communication means. The automated email operation can be done at certain times such as, for example and without limitation, when the listing first comes onto the market and on a pre-determined day of the week on a weekly basis. The open house information is then stored into the open house database.

Through method 1040, the Open House Database Processor 135 integrates open house information from real estate brokerage firms. Open house information is also often available from real estate brokerage firms, which typically keep track of open house information for listings that are held by their agents and offices. Open house information is collected from the real estate brokerage firms using methods such as, for example and without limitation, automatically or manually sending emails to the offices and making phone calls to the offices on a regular basis. Such manual email or phone call operations can also be operated using an outsourced model, wherein people in an area of lower labor costs can be employed to send email, make phone calls, and enter information to the open house database.

Through method 1050, the Open House Database Processor 135 integrates open house information from PID data free-flow text fields. In typical PIDs, there are some data fields where free-flow text are entered, and the data fields are typically named as "marketing remarks", "agent's remarks", "Internet remarks", "marketing comments", "property description", etc. These data fields often contain open house information. However, the open house information has to be parsed, because the information can be provided as "OH 3/25", "open house 3/25", "open 3/25", "open 3-25", "open Sunday", "open Sun", "open Sat/Sun", etc., and, in accordance with one or more embodiments of the present invention, the information is converted into standard information format such as "Open House Sunday 3/25/05" before being stored into the open house database.

At step 1060, all these pieces of open house information are stored in the open house database (internal or external to the Processing Unit 130 shown in FIG. 1) that allows uses such as, for example and without limitation, searches by users, display in a calendar, publication, integration to other parts of the Processing Unit 130, etc.

Not all methods 1000, 1010, 1020, 1030, 1040, and 1050 need be present for this invention to function. A combination of one or more of these methods may be sufficient for a particular market. Factors such as local market characteristics, availability of information sources, need of integration, as well as the quality and quantity of the information sources are considered, in order to determine which of the methods are to be enabled.

One or more embodiments involve a method that utilizes an open house database for generating open house information and assisting a client in planning an open house tour. The open house database may be prepared through one or more of the above-described methods. The method comprises: (a) receiving one or more search criteria pertaining to the open house tour, the search criteria being provided by at least one of a client database and a user; (b) searching the open house database, one or more property databases, and one or more extrinsic factor databases using the one or more search criteria to generate a intermediate property list; (c) creating a suggested property list based on the intermediate property list; and (d) providing the suggested property list to the user, wherein the open house database includes open house information in an area from multiple sources, and wherein the one or more extrinsic factor databases are external to the one or more property databases. In accordance with one or more embodiments of the present invention, the plurality of sources includes at least two of paper newspaper, local publications, websites, real estate agents, real estate brokerage firms, and property information databases.

In accordance with one or more embodiments of the present invention, the method further comprises generating an amenity list, the amenity list including information of amenities within a predefined distance from a route, the route connecting at least two of properties on the suggested property list. Further, in accordance with one or more embodiments of the present invention, the amenity list including information of amenities within a predefined distance from properties on the suggested property list.

In accordance with one or more embodiments of the present invention, the creating step comprises gathering information pertaining to properties on the intermediate property list and including the information pertaining to properties on the intermediate property list into the suggested property list, the information pertaining to properties on the intermediate property list being gathered from at least one of the open house database, the one or more property databases, and the one or more extrinsic factor databases. Further, in accordance with one or more embodiments of the present invention, the creating step comprises deleting one or more of properties on the intermediate property list. Still further, in accordance with one or more embodiments of the present invention, the creating step comprises ranking properties on the intermediate property list using the one or more search criteria and data from at least one of the one or more property databases and the one or more extrinsic factor databases.

In accordance with one or more embodiments of the present invention, the creating step comprises checking the intermediate property list against a history in the client database to find one or more visited properties on the intermediate property list, the one or more visited properties having been visited at least once by the client. In accordance with one or more such embodiments, the method further comprising marking the one or more visited properties with an indication to visually indicate upon display that the one or more visited properties have been visited at least once by the client. Further, in accordance with one or more embodiments of the present invention, the method further comprises showing a count of visits by the client to at least one of the one or more visited properties. Still further, in accordance with one or more embodiments of the present invention, the method of further comprises showing dates of visits by the client to at least one of the one or more visited properties. Still furthermore, in accordance with one or more embodiments of the present invention, the method further comprises showing types of visits by the client to at least one of the one or more visited properties, the types including at least one of a physical type and a virtual type. Yet still furthermore, in accordance with one or more embodiments of the present invention, the method of claim comprises deleting the one or more visited properties from the intermediate list if the one or more visited properties have been found on the intermediate list.

In accordance with one or more embodiments of the present invention, the creating step comprises enabling the user to make changes to the intermediate property list. Further, in accordance with one or more embodiments of the present invention, the creating step comprises providing a user interface that enables the user to make changes to the intermediate property list.

In accordance with one or more embodiments of the present invention, the method further comprises providing a map, the map showing at least one of locations of one or more properties on the suggested property list, directions to the one or more properties, routes for the open house tour, and an optimal route for the open house tour.

In accordance with one or more embodiments of the present invention, the method further comprises suggesting a visiting sequence for one or more properties on the suggested property list.

In accordance with one or more embodiments of the present invention, the method further comprises suggesting one or more additional properties, the one or more additional properties being within a predefined discrepancy from the one or more search criteria and within a predefined distance from one or more properties on the suggest property list.

In accordance with one or more embodiments of the present invention, the method further comprises providing tour options to the user, the tour options including at least one of a physical tour option and a virtual tour option.

In accordance with one or more embodiments of the present invention, the suggested property list is provided to the user through at least one of fax machines, emails, websites, mails, pagers, phones, cell phones, and printers.

In accordance with one or more embodiments of the present invention, the method further comprises collecting feedback of the client regarding the open house tour.

Further, one or more embodiments of the present invention involve a method for generating open house information, the method comprising: (a) receiving one or more search criteria; (b) ascertaining from a plurality of data sources using said one or more search criteria an open house property list, said plurality of data sources including at least an open house property database and a data source that is other than said open house property database; and (c) providing data pertaining to said open house property list to a user in response to a user query that specifies said one or more search criteria.

Still further, one or more embodiments of the present invention involve a method for generating open house information, the method comprising: (a) ascertaining from a plurality of data sources, said plurality of data sources including at least an open house property database and a data source that is other than said open house property database, to generate an open house property list; and (b) storing said open house property list, thereby enabling data pertaining to said open house property list to be rendered available for use in providing a response to a query for open house information from a user.

Advantages of one or more embodiments of the present invention are believed to include one or more of: (a) a comprehensive information source for planning open house tours for clients; (b) simplified open house tour planning for users and clients; (c) a comprehensive information for properties to be visited in an open house tour; (d) automated selection of properties to be visited in an open house tour; (e) additional information, such as amenity information, for convenience and enjoyment of clients during open house tours; (f) useful client preference information and opinions collected during or after open house tours.

Value Processor and Methods for Real Estate Property Valuation (Primarily Pertaining to IGEN-P004)

In accordance with one or more embodiments of the present invention, the Matching Processor 131 (shown in FIGS. 1 and 4) includes a Value Processor 430 (shown in FIG. 4). The Value Processor 430 performs a functionality of calculating or processing one or more quantitative or qualitative indexes, such as a price, of a particular property (or house) in relation to other properties (or houses) that are active on the market, pending in a contract, or with previously closed deals, or other houses that have not been on the market. The purpose of this functionality is to identify properties that are of a good value, in relation to those other properties, considering the market trends and current market conditions.

The Value Processor 430 uses a method, implemented in accordance with one or more embodiments of the present invention, to determine whether a property is a "good deal" and serve a purpose that is similar to what a real estate agent conventionally serves by qualitative thinking through every time when a buyer client asks what the agent thinks about the property. But the conventional qualitative method by the agent is imprecise, variable each time the agent thinks about it depending on the agent's state of mind, and inaccurate because of the lack of information, incorrect memory of information, etc.

In accordance with one or more embodiments of the present invention, there are many variations of alternative algorithms to determine whether a property is a "good deal". In accordance with one or more such embodiments, an algorithm is to compare whether the property's price is cheaper than other similar properties that are sold in the recent past, actively listed in the market, and/or pending in the market.

Figure 6:
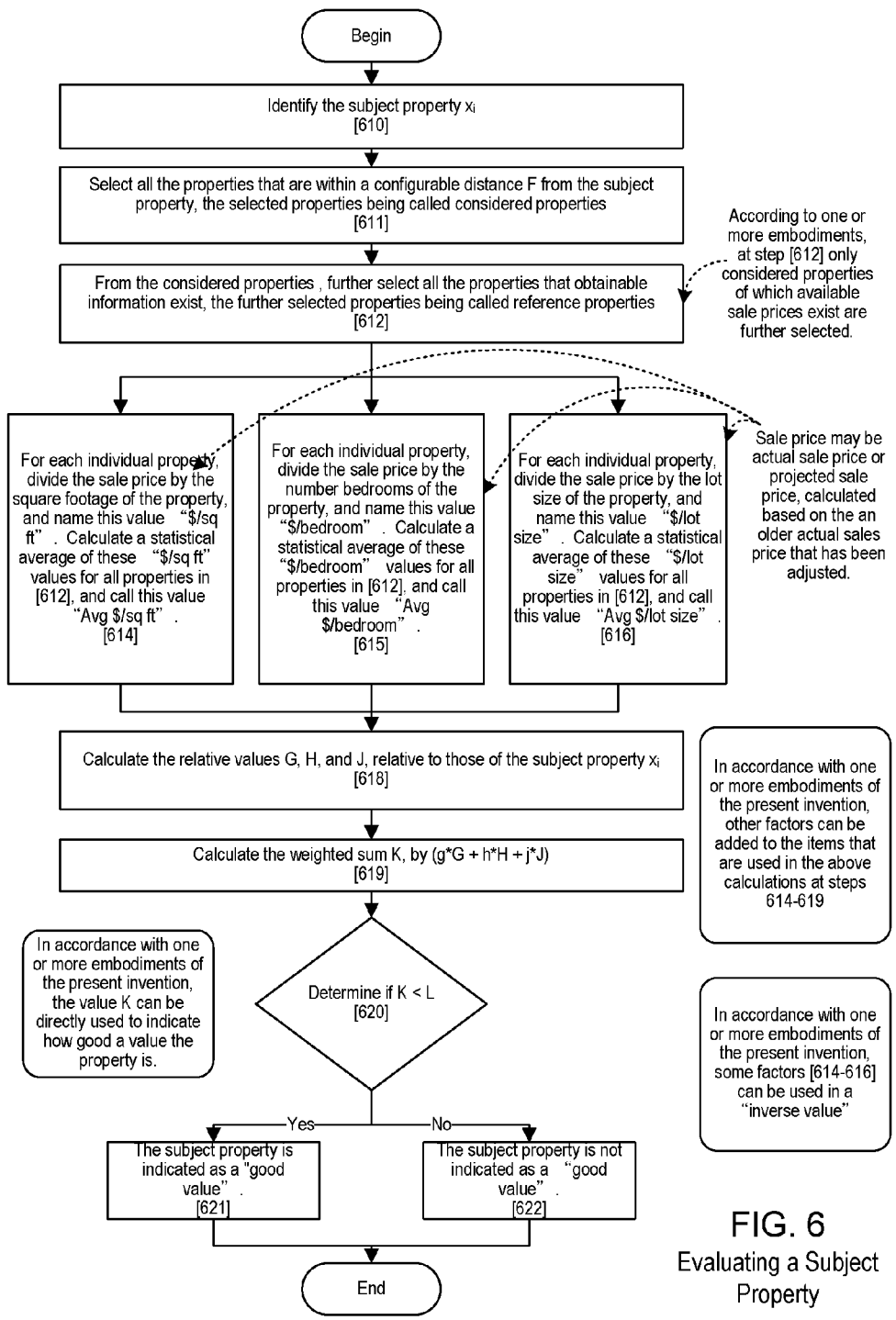
FIG. 6 shows a flowchart of a method implemented in accordance with one or more embodiments of the present invention for evaluating a subject property, the method also called a Value Processor process.

FIG. 6 shows a flowchart of a method, implemented in accordance with one or more embodiments of the present invention, for evaluating a property using one or more systems such as, for example and without limitation, the Value Processor 430 (shown in FIG. 4). As shown in FIG. 6, the method begins at step 610, at which a subject property xi is identified by a client, user (such as a real estate agent), or the Value Processor 430. Then, control is transferred to step 611.

At step 611, from one or more database with property listings, the Value Processor 430 selects all the properties that are within a configurable distance F from the subject property. The distance F can be adjusted for each xi based on how many properties are to be included in the selection within that configurable distance F. The selected properties are called considered properties. Then, control is transferred to step 612.

At step 612, from the considered properties selected at step 611, the Value Processor 430 further selects all the properties that relevant information for comparing is available, the information including one or more of publicly available data such as tax records or county transfer records, information from PID databases, newspaper publications, sales prices, etc. The further selected properties are called reference properties. In accordance with one or more embodiments of the present invention, only considered properties of which sales prices are available are selected as reference properties. Then, control is transferred to steps 614, 615, and 616.

At step 614, for each and every reference property resulted from step 612, the Value Processor 430 divides the sale price of the reference property by the square footage of the reference property, thereby producing a "$/sq ft" value. Then, the Value Processor 430 calculates a statistical average, such as a mean, median, mode, or weighted mean, of the "$/sq ft" values for all reference properties resulted from step 612, the statistical average being called an "Avg $/sq ft" value. Then, control is transferred to step 618.

At step 615, for each and every reference property resulted from step 612, the Value Processor 430 divides the sale price of the reference property by the number of bedrooms in the reference property, thereby producing a "$/bedroom" value. Then, the Value Processor 430 calculates a statistical average, such as a mean, median, mode, or weighted mean, of the "$/bedroom" values for all reference properties resulted from step 612, the statistical average being called an "Avg $/bedroom" value. Then, control is transferred to step 618.

At step 616, for each and every reference property resulted from step 612, the Value Processor 430 divides the sale price of the reference property by the property lot size (in square foot or any other area unit) of the reference property, thereby producing a "$/lot size" value. Then, the Value Processor 430 calculates a statistical average, such as a mean, median, mode, or weighted mean, of the "$/lot size" values for all reference properties resulted from step 612, and the statistical average being "Avg $/lot size" value. Then, control is transferred to step 618.

In accordance with one or more embodiments of the present invention, the sale price used in 614, 615, and 616 includes an actual sale price that has been recorded by public transfer records, tax records, or recorded in PIDs. Further, in accordance with one or more embodiments of the present invention, this sales price includes a projected sale price, calculated based on the an older actual sales price that has been adjusted for inflation, local market appreciation/depreciation, regional market appreciation/depreciation, interest rate changes, change of fundamental characteristics of the house such as remodeling, addition, or construction. Adjustments to the older actual sales price can be done using one or more statistical regression techniques.

At step 618, in accordance with one or more embodiments of the present invention, the Value Processor 430 calculates relative values G, H, and J, wherein: (a) G=the "$/sq ft" value for property xi divided by the "Avg $/sq ft" value calculated at step 614; (b) H=the "$/bedroom" value for the property xi divided by the "Avg $/bedroom" value calculated at step 615; and (c) J=the "$/lot size" for the property xi divided by the "Avg $/lot size" value calculated at step 616. Then, control is transferred to step 619.

In accordance with one or more embodiments of the present invention, at step 618, the time or lengths of time for which the reference properties were sold are taken into account. In accordance with one or more such embodiments, the averaging calculations of the "Avg $/sq ft", "Avg $/bedrooms" and "Avg $/lot size" are to take into account a weighting factor based on the number of days between the current time and the time when the reference properties were sold.

At step 619, the Value Processor 430 calculates a weighted sum K, K=g*G+h*H+j*J, wherein g, h and j are configurable weights for square footage, number of bedrooms, and lot size factors, respectively. Then, control is transferred to step 620.

At step 620, the Value Processor 430 compares K to a pre-determined number L, and if K<L, then control is transferred to step 621, at which the property xi is indicated as a "good value"; if K>L or K=L, then control is transferred to step 622, at which property xi is not indicated as a "good value" or alternatively indicated as "not a good value". In accordance with one or more embodiments of the present invention, the value K can be directly used to indicate how good a value the property is in a continuous spectrum without executing step 620. In accordance with one or more embodiments of the present invention, a lower value K indicates a better value, given that K is proportional to prices. In accordance with one or more embodiments of the present invention, a higher value K indicates a better value. In accordance with one or more embodiments of the present invention, in situations where a square footage, number of bedrooms, or lot size value is not available for the subject property xi or a property that the user would like to include as a reference property, then that value is omitted from the calculation, and the final sum K is scaled accordingly.

In accordance with one or more embodiments of the present invention, other factors can be added to the items that are used in one or more of the above calculations at steps 614, 615, 616, 617, 618, and 619. For example and without limitation, these factors may include on or more of the number of bathrooms, the number of stories, number of garage parking space, and house frontage on the street.

In accordance with one or more embodiments of the present invention, one or more factors that have "inverse values" can be included in the above method. For example and without limitation, one of such factors is the age of the house. In accordance with one or more such embodiments, an inverse of one of such factors may be included. For example, if the age of the house is 5 years old, then the inverse of such (1/5) may be used as the value for the age factor.

Figure 7:
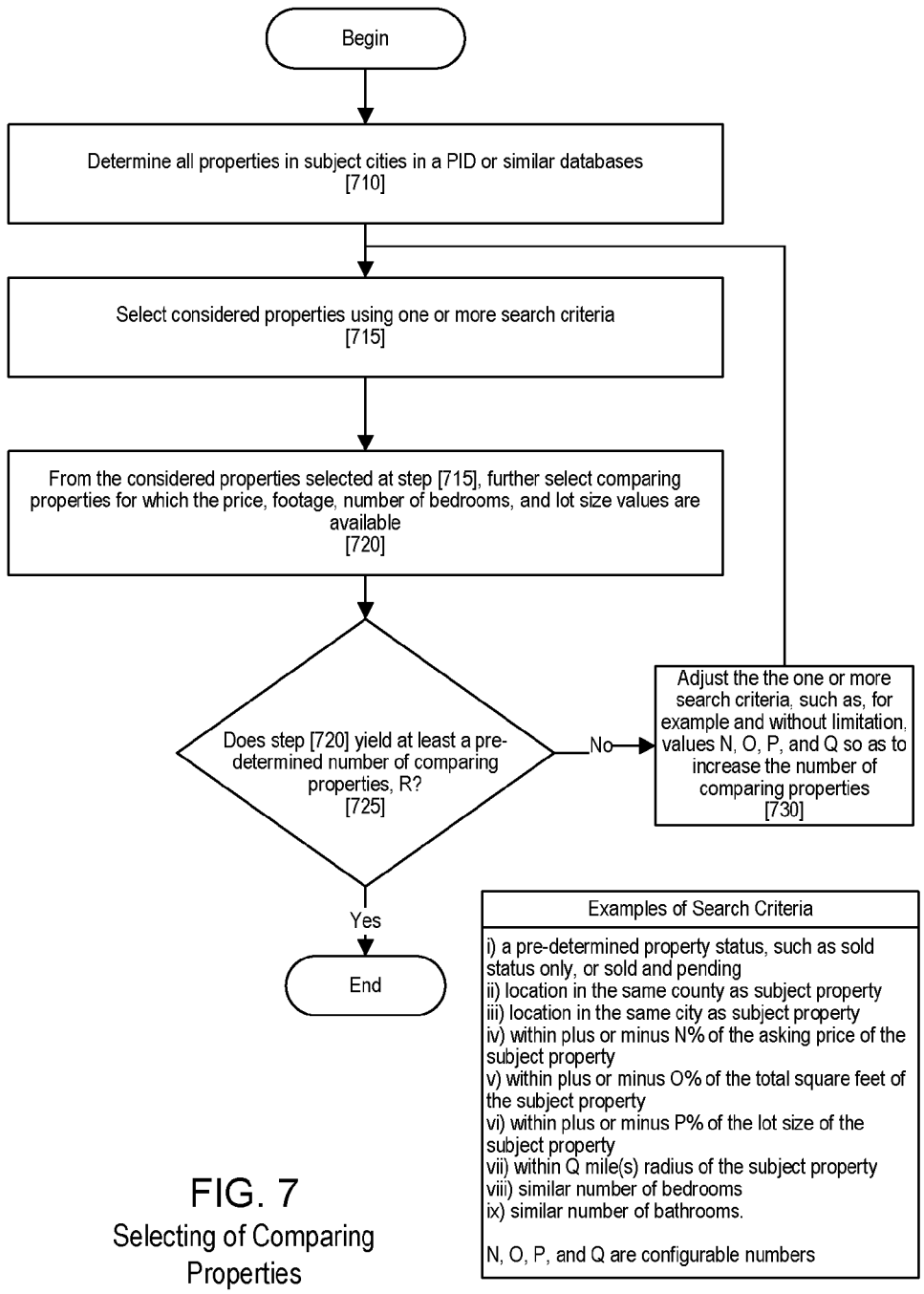
FIG. 7 shows a flowchart of a method, implemented in accordance with one or more embodiments of the present invention, for searching for comparative properties.

FIG. 7 shows a method, implemented in accordance with one or more embodiments of the present invention, for selecting considered properties and reference properties at steps 611 (shown in FIG. 6) and 612 (shown in FIG. 6) using one or more systems such as, for example and without limitation, the Value Processor 430 (shown in FIG. 4). As shown in FIG. 7, the method begins at step 710, at which the Value Processor 430 determines all properties in subject cities in a PID or similar databases. Then, control is transferred to step 715.

At step 715, the Value Processor 430 selects considered properties using one or more search criteria. In accordance with one or more embodiments of the present invention, the one or more search criteria may include one or more factors such as, for example and without limitation, (i) a pre-determined property status, such as sold status only, or sold and pending, (ii) location in the same county as the subject property, (iii) location in the same city as the subject property, (iv) within plus or minus N % of the asking price of the subject property, (v) within plus or minus O % of the total square feet of the subject property, (vi) within plus or minus P % of the lot size of the subject property, (vii) within Q mile(s) radius of the subject property, (viii) similar number of bedrooms, (ix) similar number of bathrooms. N, O, P, and Q are configurable numbers. In accordance with one or more embodiments of the present invention, the search criteria may include a particular pre-configurable status, such as being active on the market for a configurable number of days, M. Then, control is transferred to step 720.

At step 720, from the considered properties selected at step 715, the Value Processor 430 further selects reference properties for which the price, footage, number of bedrooms, and lot size values are available. Then, control is transferred to step 725.

At step 725, the Value Processor 430 checks the number of reference properties resulted at step 720. If the number is greater than or equal to a pre-determined number, R, then the process for selecting reference properties ends and control is transferred to steps 614-616 shown in FIG. 6; if the number is less than the pre-determined number (R), then control is transferred to step 730.

At step 730, the Value Processor 430 adjusts the one or more search criteria, such as, for example and without limitation, one or more of values N, O, P, and Q so as to increase the number of reference properties. In accordance with one or more embodiments of the present invention, steps 730, 715, and 720 are repeated until at least the pre-determined number (R) of reference properties are selected at step 720.

One or more embodiments of the present invention involve a computer-implemented method for pre-processing property data in a first property database. The computer-implemented method comprises: (a) comparing an asking price of a first subject property against values of a set of reference properties, the first subject property representing a for-sale property in the first property database, the set of reference properties being selected based on a predefined comparison algorithm that includes selection criteria that, when applied against a set of data sources that includes the first property database, results in the set of reference properties; (b) assigning at least one of a quantitative assessment and a qualitative assessment to the subject property based on the comparing, the at least one of a quantitative assessment and a qualitative assessment assessing the subject property based on whether the subject property represents a profitable purchase; and (c) storing the at least one of the quantitative assessment and the qualitative assessment such that the at least one of the quantitative assessment and the qualitative assessment is available to a user who subsequently views data pertaining to the subject property.

In accordance with one or more embodiments of the present invention, the steps (a), (b) and (c) are performed for a plurality of subject properties in the first property database, the plurality of subject properties in the first property database having at least one of their qualitative assessments and their quantitative assessments assigned even if properties in the plurality of subject properties are not subject of a user query at the moment that the at least one of their qualitative assessments and their quantitative assessments are assigned.

In accordance with one or more embodiments of the present invention, the set of data sources also includes at least one database other than the first property database. Further, in accordance with one or more embodiments of the present invention, the set of data sources also includes at least one non-electronic source. Still further, in accordance with one or more embodiments of the present invention, the values of the set of reference properties are computed based on data that is obtained in a data source other than the first property database.

In accordance with one or more embodiments of the present invention, the selection criteria representing selecting only properties having the same value for a given quantifiable characteristic. Further, in accordance with one or more embodiments of the present invention, the selection criteria representing selecting only properties having values within the same range for a given quantifiable characteristic.

In accordance with one or more embodiments of the present invention, the quantitative assessment is within a numerical range such as, for example and without limitation, from 10 to 1, one end of the numerical range denoting a highly profitable potential purchase, an opposite end of the numerical range denoting a highly unprofitable potential purchase. Further, in accordance with one or more embodiments of the present invention, the qualitative assessment is within an alphabetical range such as, for example and without limitation, from A to E, one end of the alphabetical range denoting a highly profitable potential purchase, an opposite end of the alphabetical range denoting a highly unprofitable potential purchase. Still further, in accordance with one or more embodiments of the present invention, the quantitative assessment is within an alpha-numerical range such as, for example and without limitation, from A5 to E1, one end of the alpha-numerical range denoting a highly profitable potential purchase, an opposite end of the alpha-numerical range denoting a highly unprofitable potential purchase. Still further, the qualitative assessment includes one of a plurality of labels, one of the labels denoting a profitable potential purchase, another one of the labels denoting an unprofitable potential purchase.

In accordance with one or more embodiments of the present invention, the steps (a), (b) and (c) are performed for a plurality of subject properties in the first property database, and the computer-implemented method further comprises generating a report, the report including at least one of (i) a list of recommended properties, each of the recommended properties being one of the plurality of subject properties with the at least one of the quantitative assessment and the qualitative assessment meeting one or more pre-determined conditions, and (ii) a list of the plurality of subject properties with an indication of the at least one of the quantitative assessment and the qualitative assessment for each of the plurality of subject properties.

Further, one or more embodiments of the present invention involves a computer-implemented method for evaluating a subject property, the computer-implemented method comprising: (a) determining one or more search criteria; (b) searching one or more databases using the one or more search criteria to find one or more considered properties; (c) defining an index such that subject property data pertaining to the index of the subject property is available; (d) selecting one or more reference properties from the one or more considered properties; (e) receiving the subject property data pertaining to the index of the subject property; (f) receiving reference property data, the reference property data being calculated from data pertaining to the index of the one or more reference properties; (g) comparing the subject property data and the reference property data and (h) assigning an assessment of the subject property based on a result of the comparing. The assessment may be a numerical score (such as a number from a 1-10 scale), alphabetical grade (such as a letter from an A-E scale), or a text comment (such as 'a good value' or 'not a good value').

In accordance with one or more embodiments of the present invention, the one or more search criteria include at least one of distances from the subject property, configurable distances from the subject property, property statuses, locations, locations in a same county as the subject property, locations in a same city as the subject property, price ranges, price differences from an asking price of the subject property, footage ranges, footage differences from a footage of the subject property, lot size ranges, lot size differences from a lot size of the subject property, number of bedrooms, number of bathrooms, and age ranges.

In accordance with one or more embodiments of the present invention, the one or more search criteria are determined according to a relation between a pre-determined number and a resulted number of the one or more considered properties. In accordance with one or more such embodiments, the relation is at least one of: the resulted number being greater than the pre-determined number, the resulted number being equal to the pre-determined number, and the resulted number being less than the pre-determined number.

In accordance with one or more embodiments of the present invention, the one or more search criteria are determined according to a relation between a pre-determined number and a resulted number of the one or more reference properties. In accordance with one or more such embodiments, the relation is at least one of: the resulted number being greater than the pre-determined number, the resulted number being equal to the pre-determined number, and the resulted number being less than the pre-determined number.

In accordance with one or more embodiments of the present invention, the one or more reference properties are selected such that the data pertaining to the index of all the one or more reference properties are available. Further, in accordance with one or more embodiments of the present invention, the index is chosen such that the data pertaining to the index of all the one or more considered properties are available. Still further, the index is determined according to a relation between a pre-determined number and a resulted number of the one or more reference properties. In accordance with one or more such embodiments, the relation is at least one of: the resulted number being greater than the pre-determined number, the resulted number being equal to the pre-determined number, and the resulted number being less than the pre-determined number.

In accordance with one or more embodiments of the present invention, the index include at least one of: (a) prices, (b) footages, (c) numbers of bedrooms, (d) lot sizes, (e) ages, (f) numbers of bathrooms, (g) number of stories, (h) numbers of parking spaces, (i) numbers of garage parking spaces, (j) house frontage on a street, (k) time between posting and sale, (l) time between sale and current time, (m) relations of two or more of (a)-(l), and (n) combinations of two or more of the relations of two of more of (a)-(l). Further, in accordance with one or more embodiments of the present invention, the index includes a weighted sum of a price-footage relation, a price-number of bedrooms relation, and a price-lot size relation. Still further, in accordance with one or more embodiments of the present invention, the index incorporating a price, the price including at least one of prices recorded in public transfer records, prices recorded in tax records, prices recorded in one or more property information databases, and prices calculated based on previous actual sales prices and adjusted for one or more market factors.

In accordance with one or more embodiments of the present invention, the reference property data is a statistical average of the data pertaining to the index of all the one or more reference properties. In accordance with one or more such embodiments, the statistical average includes at least one of means, medians, modes, and weighted means.

In accordance with one or more embodiments of the present invention, the comparing step comprises: (a) calculating a relation of the subject property data and the reference property data using a mathematical operation; and (b) comparing the relation with a predetermined numerical standard.

In accordance with one or more embodiments of the present invention, the searching step comprises: (a) receiving the one or more search criteria; (b) checking the one or more search criteria against one or more references to find one or more changeable text strings, the one or more references including a real estate dictionary; (c) changing the one or more changeable text strings into one or more transformed terms if the one or more changeable text strings are found; (d) creating one or more refined search criteria using the one or more transformed terms; and (e) searching in one or more databases using the one or more refined search criteria to find the one or more considered properties, the one or more databases include a property database. In accordance with one or more such embodiments, the creating step comprising: (a) parsing the one or more transformed terms to find one or more relevant criteria; and (b) translating the one or more relevant criteria into the one or more refined search criteria if the one or more relevant criteria are found.

In accordance with one or more embodiments of the present invention, the searching step comprises: (a) receiving the one or more search criteria; (b) searching one or more property databases using the one or more criteria to find one or more intermediate properties; (c) receiving at least one of extrinsic data and intrinsic data, the extrinsic data pertaining to data from one or more extrinsic factor databases external to the one or more property databases and pertaining to at least of the one or more intermediate properties, the intrinsic data pertaining to data from the one or more property databases and pertaining to other properties within a predefined vicinity of the at least of the one or more intermediate properties, the other properties excluding the one or more intermediate properties; and (d) searching one or more of the one or more property and extrinsic factor databases using the at least one of extrinsic data and intrinsic data to find the considered properties.

Further, one or more embodiments of the present invention involve a system for real estate property valuation, the system comprising: (a) a first property database; and (b) a computer configured to: (i) compare a price of a first subject property against values of a set of reference properties, the first subject property representing a for-sale property in the first property database, the set of reference properties being selected based on a predefined comparison algorithm that includes selection criteria that, when applied against a set of data sources, results in the set of reference properties; (ii) assign at least one of a quantitative assessment and a qualitative assessment to the subject property based on the comparing, the at least one of a quantitative assessment and a qualitative assessment based on whether the subject property represents a profitable purchase; and (iii) store the at least one of the quantitative assessment and the qualitative assessment such that the at least one of the quantitative assessment and the qualitative assessment is available to a user who subsequently views data pertaining to the subject property.

In accordance with one or more such embodiments, the computer is further configured to perform (i), (ii) and (iii) for a plurality of subject properties in the first property database, the plurality of subject properties in the first property database having at least one of their qualitative assessments and their quantitative assessments assigned even if properties in the plurality of subject properties are not subject of a user query at the moment that the at least one of their qualitative assessments and their quantitative assessments are assigned.

Further, in accordance with one or more embodiments of the present invention, the computer is further configured to: (a) perform (i), (ii) and (iii) for a plurality of subject properties in the first property database; and (b) generate a report, the report including at least one of (1) a list of recommended properties, each of the recommended properties being one of the plurality of subject properties with the at least one of the quantitative assessment and the qualitative assessment meeting one or more pre-determined conditions, and (2) a list of the plurality of subject properties including an indication of the at least one of the quantitative assessment and the qualitative assessment for each of the plurality of subject properties.

Advantages of one or more embodiments of the present invention are believed to include one or more of: (a) efficient and effective decision-making for prospective buyers with pre-screened good deals; (b) high efficiency and precision given computer-implemented calculation; (c) high consistency given methodical evaluation; (d) high flexibility given configurable search criteria and evaluation attributes; and (e) high accuracy given comprehensive data.

Automatic Market Trend Information Generator and a Method for Generating and Providing Market Information In accordance with one or more embodiments of the present invention, as shown in FIG. 1, the Processing Unit 130 further comprises a Market Information Generator 139. The Market Information Generator 139 uses data from different databases such as, for example and without limitation, the PID 110 and other Extrinsic Factor Databases 120 shown in FIG. 1. The types of information that real estate buyers or sellers like to see include but not limited to average mean price, median price, average days on market, days of inventory, number of closed transactions, number of new listings, and current inventory level. In accordance with one or more embodiments of the present invention, the Market Information Generator 139 generates such data pertaining to a particular city, a particular county, a larger regional area, or nationally.

Figure 9:
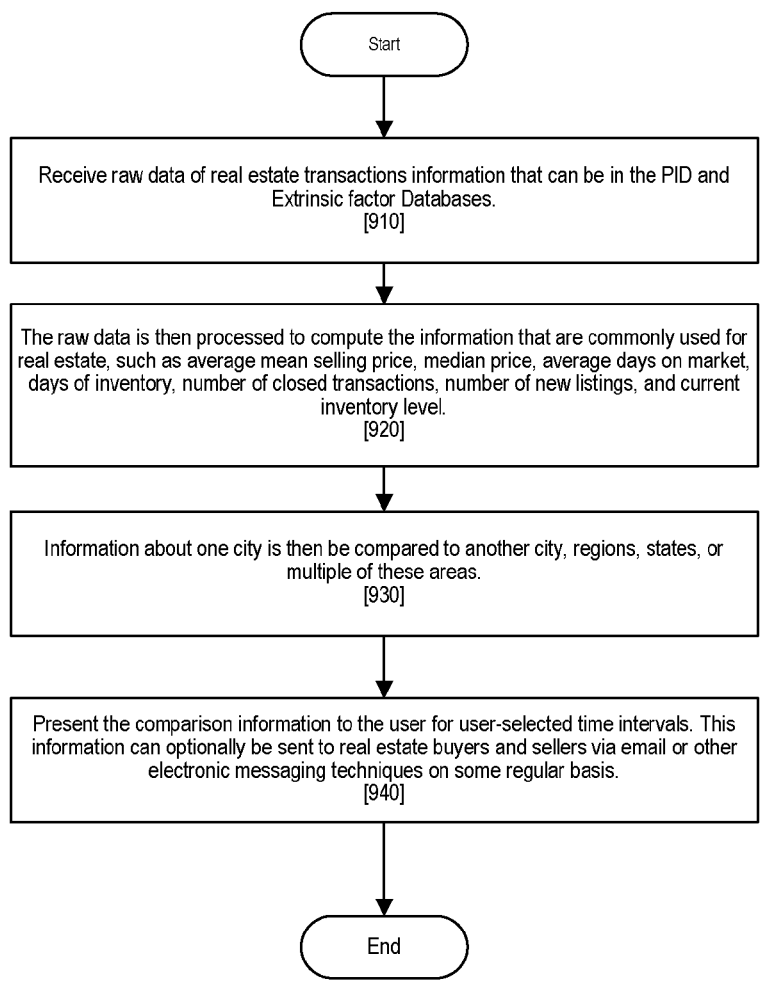
FIG. 9 shows a flowchart of a method, implemented in accordance with one or more embodiments of the present invention, for generating market trend data.

FIG. 9 shows a flowchart of a method, implemented in accordance with one or more embodiments of the present invention, for generating and providing above-mentioned data to one or more users using one or more systems such as, for example and without limitation, the Market Information Generator 139. As shown in FIG. 9, the method starts at step 910, the Market Information Generator 139 receives raw data of real estate transactions information from one or more databases such as, for example and without limitation, the PID 110 and Extrinsic Factor Database 120 shown in FIG. 1. Then, control is transferred to step 920.

At step 920, the Market Information Generator 139 processes the raw data to compute one or more types of information that are commonly used for real estate such as, for example and without limitation, average mean selling price, median price, average days on market, days of inventory, number of closed transactions, number of new listings, or current inventory level. For example, the average selling price of the properties in Palo Alto, Calif. for a month can be computed by locating all the properties of a particular category, such as single family home, and finding the mean average selling price of those properties. A similar calculation can be done for all the properties in that month for all of Santa Clara County, or a larger metropolitan area. This raw data can be processed in real time while information is requested by a user, or periodically according to pre-determined regular periods such as, for example and without limitation, daily, weekly, monthly, or annually. Then, control is transferred to step 930.

At step 930, the Market Information Generator 139 compares information pertaining to one city with information pertaining to another city, regions, states, or multiple of these areas to generate comparison information. Then control is transferred to step 940.

At step 940, the comparison information may be shown in graphs or in tables, and these will be displayed to the users (i.e., real estate buyers or sellers) real-time over the web or software client interfaces, or via automatic email or other electronic messaging techniques. The comparison information may be shown in various time intervals, changeable by the user by selecting "last month", "last 6 months", "last year", "last 5 years", or other time intervals. All these graphs or tables are generated and shown to the users as they select the information they would like to see. Further, the comparison information may be sent to real estate buyers and sellers via email or other electronic messaging techniques on some regular basis. As such, users may select, using electronic devices, by areas (cities, regions, states) and by time ranges, and may view multiple geographical and temporal market information comparisons at the same time on a real-time basis or periodically.

In accordance with one or more embodiments of the present invention, the Market Information Generator 139 is integrated with the other features of the Processing Unit 130 and shown on the same interface such that the market information (or comparison information) can be readily available in a real-time user interface such that the data become very useful in helping the real estate buyers or sellers decide what the real estate market trends are. This kind of market information has been readily available for people evaluating different stocks to purchase, but has not been available at all for real estate markets, despite the usually much larger amount of investments that are usually involved in real estate purchases.

Advantages of one or more embodiments of the present are believed to included one or more of: (a) real-time presentation of real estate market information for buyers and sellers to make decision with most updated information; (b) geographical and temporal comparison information for buyers and sellers to consider market trends in making decisions; and (c) user-configurable information types for buyers and sellers to efficiently make decision using only relevant information.

Systems and methods are disclosed in the above description. One or more embodiments may include one or more stand-alone computers or networked computers that constitute one or more of the systems or implement one or more of the methods.

Having disclosed exemplary embodiments and the best mode, modifications and variations may be made to the disclosed embodiments while remaining within the subject and spirit of the invention. Sections such as title and abstract and summary are provided herein for convenience and are not intended to limit the scope of the claims, which determines the claimed invention. The scope of the invention should, therefore, be determined not with reference to the above description, but instead should be determined with reference to the appended claims along with their full scope of equivalents.

What is claimed is:

1. A computer-implemented method for generating, responsive to user input from a user, a set of property results, said set of property results including data pertaining to one or more properties, the computer-implemented method comprising:

receiving the user input, the user input including one or more text strings wherein the text string comprises jargon used in the real estate industry;

checking the one or more text strings against one or more references comprising one or more of geographical area names, street names, building names, business names, and facility names to find one or more changeable text strings, the one or more references including a real estate dictionary;

forming one or more search criteria using one or more transformed terms, the one or more transformed terms pertaining to the one or more changeable text strings wherein the forming step comprises:

changing the one or more changeable text strings into the one or more transformed terms if the one or more changeable text strings are found; and creating the one or more search criteria using the one or more transformed terms by parsing the one or more transformed terms to find one or more relevant criteria and translating the one or more relevant criteria into the one or more search criteria if the one or more relevant criteria are found;

wherein parsing includes identifying one or more measurement units in the user input or the one or more transformed terms;

wherein the translating step includes converting one or more abstract terms in the one or more relevant criteria into one or more logical or mathematical representations, the one or more logical or mathematical representations being a subset of the one or more search criteria;

searching in one or more databases using the one or more search criteria to produce the set of property results, the one or more databases include one or more property databases.

2. The computer-implemented method of claim 1 wherein the creating step further comprising using data from a client database, the client database containing client preference data.

3. The computer-implemented method of claim 1 wherein the one or more references further include a language dictionary.

4. The computer-implemented method of claim 1 wherein the one or more references further include a list, the list comprising one or more of geographical area names, street names, building names, business names, and facility names.

5. The computer-implemented method of claim 1 wherein the one or more changeable text strings include at least one of abbreviations, acronyms, symbols, misspelled words, mistyped words, spelling errors, and typographical errors.

6. The computer-implemented method of claim 1 further comprising receiving data from an extrinsic factor database in one or more of the checking, changing, creating, and searching steps, the extrinsic factor database being external to the one or more property databases.

7. The computer-implemented method of claim 1 further comprising receiving data from a self-learning system in one or more of the checking, changing, parsing, translating, and searching steps, the self-learning system being configured to store intermediate information, the intermediate information including at least one or the one or more understandable terms, the one or more relevant criteria, and the one or more search criteria.

8. The computer-implemented method of claim 1 further comprising storing unused information into a self-learning system, the unused information being filtered in the creating step.

9. The computer-implemented method of claim 1 further comprising identifying one or more negative search criteria in the user input or the one or more transformed terms.

10. The computer-implemented method of claim 1 further comprising:

generating one or more additional criteria based on the one or more search criteria; and searching in the one or more databases using the one or more additional criteria to produce an additional set of property results.

11. The computer-implemented method of claim 1 wherein the searching step comprises:

receiving the one or more search criteria;

searching the one or more property databases using the one or more criteria to find one or more intermediate properties;

receiving at least one of extrinsic data and intrinsic data, the extrinsic data pertaining to data from one or more extrinsic factor databases external to the one or more property databases and pertaining to at least of the one or more intermediate properties, the intrinsic data pertaining to data from the one or more property databases and pertaining to other properties within a predefined vicinity of the at least of the one or more intermediate properties, the other properties excluding the one or more intermediate properties; and searching one or more of the one or more property and extrinsic factor databases using the at least one of extrinsic data and intrinsic data to generate the set of property results.

12. A system comprising a processor and a computer readable medium having instructions stored thereon, that when executed by the processor cause the processor to generate, responsive to user input from a user, a set of property results, said set of property results including data pertaining to one or more properties, the processor being caused to:

receive the user input, the user input including one or more text strings wherein the text string comprises jargon used in the real estate industry;

check the one or more text strings against one or more references comprising one or more of geographical area names, street names, building names, business names, and facility names to find one or more changeable text strings, the one or more references including a real estate dictionary;

form one or more search criteria using one or more transformed terms, the one or more transformed terms pertaining to the one or more changeable text strings wherein the forming step comprises:

changing the one or more changeable text strings into the one or more transformed terms if the one or more changeable text strings are found; and creating the one or more search criteria using the one or more transformed terms by parsing the one or more transformed terms to find one or more relevant criteria and translating the one or more relevant criteria into the one or more search criteria if the one or more relevant criteria are found;

wherein parsing includes identifying one or more measurement units in the user input or the one or more transformed terms;

wherein the translating step includes converting one or more abstract terms in the one or more relevant criteria into one or more logical or mathematical representations, the one or more logical or mathematical representations being a subset of the one or more search criteria;

search in one or more databases using the one or more search criteria to produce the set of property results, the one or more databases include one or more property databases.

13. The system of claim 12, further comprising:

a search interpreter configured to deduce from the user input: (a) location information of the one or more properties, and (b) one or more search criteria; and a search engine configured to search one or more databases using the location information and the one or more search criteria to generate the set of property results;

a processor for performing one or more of the above recited functions.

14. The system of claim 12, wherein the one or more database includes a property information database.

15. The system of claim 12, wherein the one or more database includes an extrinsic factor database.

16. The system of claim 12, wherein the search interpreter comprises:

a location information parser configured to deduce the location information of the one or more properties using one or more geographic area names pertaining to the user input; and a property attribute translator configured to form the one or more search criteria using one or more relevant criteria pertaining to the user input.

17. The system of claim 16, wherein the search interpreter further comprises an input clean-up engine, the input clean-up engine configured to:

check the user input against one or more references to find one or more changeable text strings, the one or more references including a real estate dictionary; and form the one or more relevant criteria using the one or more changeable text strings.

18. The system of claim 17, wherein the input clean-up engine is further configured to generate the one or more geographic area names using the one or more changeable text strings.

19. The system of claim 16, wherein the search interpreter further comprises a self-learning system configured to collected unused information of the user input, the unused information of the user input being unused by the location information parser and the property attribute translator.

20. The system of claim 12, further comprising a preference information collector configured to collect information pertaining to at least one of the user input, the one or more search criteria, and the user.

* * * * *